United States Patent
Bhattad et al.

(10) Patent No.: US 11,672,008 B2
(45) Date of Patent: Jun. 6, 2023

(54) CHANNEL OCCUPANCY TIME (COT) SHARING

(71) Applicant: QUALCOMM Incorporated, San Diego, CA (US)

(72) Inventors: Kapil Bhattad, Bangalore (IN); Jing Sun, San Diego, CA (US); Xiaoxia Zhang, San Diego, CA (US); Pravjyot Singh Deogun, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 16/814,634

(22) Filed: Mar. 10, 2020

(65) Prior Publication Data

US 2020/0314901 A1 Oct. 1, 2020

(30) Foreign Application Priority Data

Mar. 25, 2019 (IN) .............................. 201941011461

(51) Int. Cl.
*H04W 74/08* (2009.01)
*H04W 72/12* (2023.01)

(52) U.S. Cl.
CPC ....... *H04W 74/0808* (2013.01); *H04W 72/12* (2013.01)

(58) Field of Classification Search
CPC .......................... H04W 74/0808; H04W 72/12
See application file for complete search history.

(56) References Cited

U.S. PATENT DOCUMENTS

| 10,536,972 B2 | 1/2020 | Kim et al. |
| 2008/0070585 A1* | 3/2008 | Wu ........................ H04W 52/34 |
| | | 455/452.2 |

(Continued)

FOREIGN PATENT DOCUMENTS

| WO | 2019027297 A1 | 2/2019 |
| WO | WO-2019027297 A1 | 2/2019 |

OTHER PUBLICATIONS

International Search Report and Written Opinion—PCT/US2020/022126—ISAEPO—dated Jun. 9, 2020.

(Continued)

*Primary Examiner* — Kevin M Cunningham
(74) *Attorney, Agent, or Firm* — Harrity & Harrity LLP/Qualcomm Incorporated

(57) ABSTRACT

This disclosure provides systems, methods, and apparatuses for channel occupancy time (COT) sharing arrangements when two or more COTs are associated with different durations, and provides arrangements for base station scheduling of downlink transmissions and selection of a listen-before-talk (LBT) configuration when two or more COTs are associated with different user equipment (UE) transmission endpoints. Furthermore, this disclosure provides systems, methods, and apparatuses for UE-side communication in accordance with scheduling information determined based on such COT sharing arrangements. By providing COT sharing arrangements when two or more COTs are associated with different durations, unlicensed channel utilization may be improved and throughput may be increased relative to when only one UE's COT can be used by the base station. By providing arrangements for scheduling downlink transmissions and selecting an LBT configuration, unlicensed channel utilization may be improved and access to the unlicensed medium may be streamlined.

30 Claims, 19 Drawing Sheets

(56) References Cited

U.S. PATENT DOCUMENTS

| | | | |
|---|---|---|---|
| 2018/0027554 A1* | 1/2018 | Yerramalli | H04L 1/0009 |
| | | | 370/329 |
| 2019/0208540 A1* | 7/2019 | Kim | H04W 16/14 |
| 2020/0305191 A1* | 9/2020 | Moon | H04W 74/0808 |
| 2021/0344451 A1* | 11/2021 | Hedayat | H04W 74/0816 |

OTHER PUBLICATIONS

OPPO: "Channel Access Procedures for NR-U", 3GPP Draft, R1-1901922, 3GPP TSG RAN WG1 #96, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051599616, 6 Pages, Retrieved from the Internet: URL: http://www.3gpp.org/ftp/tsg%5Fran/WG1%5FRL1/TSGR1%5F96/Docs/R1%2D1901922%2Ezip, [retrieved on Feb. 16, 2019], paragraphs [001.], [002.], [2.1.], [2.2.], [005.], [007.].

Qualcomm Incorporated: "Enhancement to Configured Grants in NR Unlicensed", 3GPP Draft, 3GPP TSG RAN WG1 Meeting #AH1901, R1-1900876 Enhancement to Configured Grants for NR-U, 3rd Generation Partnership Project (3GPP), Mobile Competence Centre, 650, Route Des Lucioles, F-06921 Sophia-Antipolis Cedex, Fran, vol. RAN WG1, No. Taipei, Taiwan, Jan. 21, 2019-Jan. 25, 2019, Jan. 20, 2019 (Jan. 20, 2019), XP051593722, 9 Pages, Retrieved from the Internet: URL: http://www.3gpp.org/ftp/Meetings%5F3GPP%5FSYNC/RAN1/Docs/R1%2D1900876%2Ezip [retrieved on Jan. 20, 2019] paragraphs [03.2], [3.2.1], [3.2.2].

\* cited by examiner

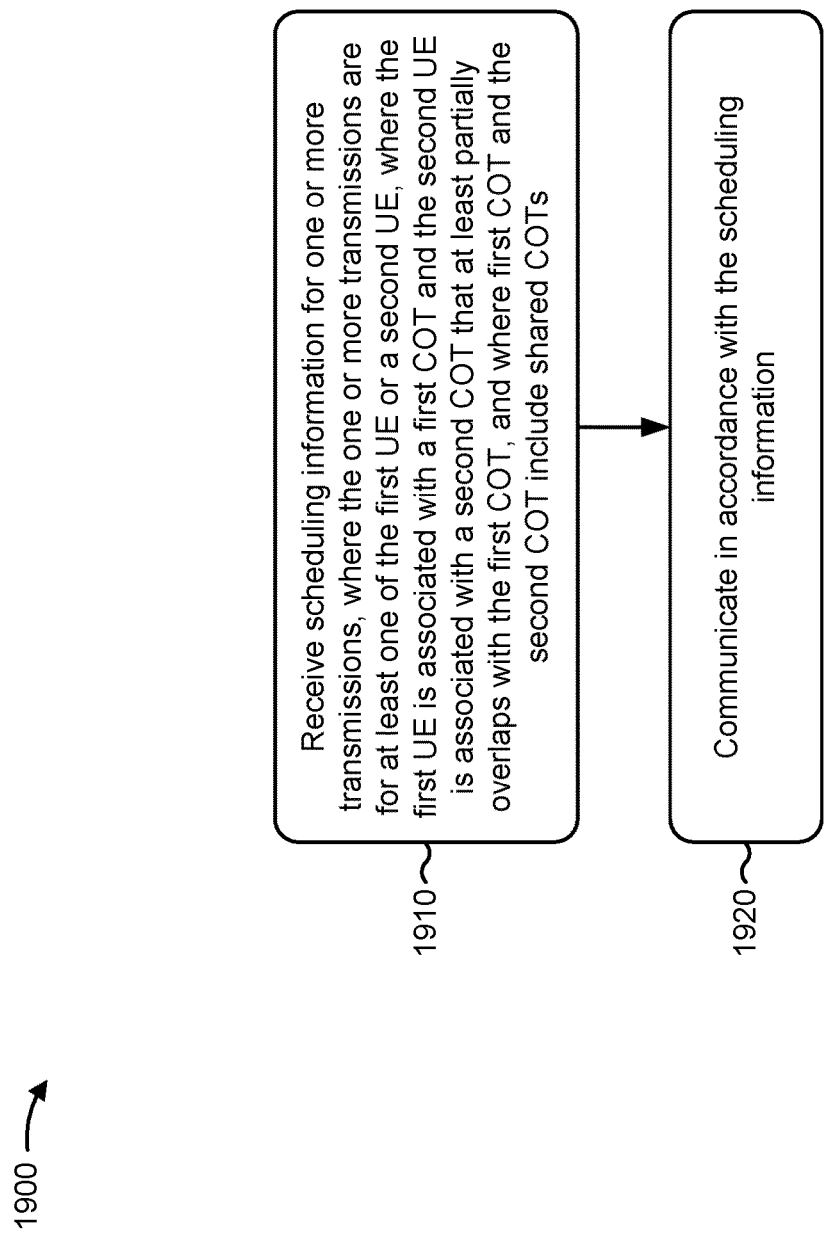

CHANNEL OCCUPANCY TIME (COT) SHARING

CROSS-REFERENCE TO RELATED APPLICATION

This Patent Application claims priority to Indian Provisional Patent Application No. 201941011461, filed on Mar. 25, 2019, entitled "CHANNEL OCCUPANCY TIME (COT) SHARING," and assigned to the assignee hereof. The disclosure of the prior Application is considered part of and is incorporated by reference in this Patent Application.

TECHNICAL FIELD

Aspects of the present disclosure relate generally to wireless communication, and in particular to techniques for channel occupancy time (COT) sharing.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipments (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, a 5G NodeB, or the like.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a base station (BS). The method may include scheduling one or more transmissions for at least one of: a first user equipment (UE) that is associated with a first channel occupancy time (COT), or a second UE that is associated with a second COT, where the first COT at least partially overlaps with the second COT, and where the first COT and the second COT include shared COTs; and outputting the one or more transmissions.

In some implementations, a portion of the one or more transmissions is scheduled in a time interval of the second COT that does not overlap the first COT.

In some implementations, a portion of the one or more transmissions is scheduled in a subband of the second COT that does not overlap a subband of the first COT.

In some implementations, scheduling the one or more transmissions is based on respective channel access priority levels associated with the first UE and the second UE.

In some implementations, outputting the one or more transmissions further includes outputting a particular transmission, of the one or more transmissions, for the first UE after performing a listen-before-talk (LBT) operation, where a pause is configured between an end of a transmission by the first UE and a beginning of the particular transmission using the first COT, and where the particular transmission overlaps at least in part with the second COT.

In some implementations, the particular transmission is scheduled in the second COT.

In some implementations, the one or more transmissions are scheduled in one or more of the first COT or the second COT, where the one or more transmissions include respective transmissions to the first UE and the second UE.

In some implementations, the respective transmissions are scheduled after a pause that follows an end of a last transmission by the first UE or the second UE.

In some implementations, scheduling the one or more transmissions further includes scheduling the one or more transmissions based on a shortened first COT, where the shortened first COT is shortened based on an uplink or downlink transmission associated with the second UE.

In some implementations, the uplink or downlink transmission is performed in a pause of the base station, wherein the pause is associated with the first UE, and wherein the pause is initiated after a transmission endpoint of the first UE.

In some implementations, the first COT and the second COT have a same start time.

In some implementations, the one or more transmissions include a first transmission for the first UE and a second transmission for the second UE, where the first transmission is schedulable in the first COT and the second transmission is schedulable in the second COT, and where the first transmission and the second transmission are schedulable in an overlapped portion of the first COT and the second COT.

In some implementations, the one or more transmissions include a first transmission for the first UE and a second transmission for the second UE, where the first transmission and the second transmission are schedulable in an overlapped portion of the first COT and the second COT, and where the first transmission and the second transmission are not schedulable in a non-overlapped portion of the first COT or the second COT.

In some implementations, the one or more transmissions include a first transmission for the first UE and a second transmission for the second UE, where the first transmission and the second transmission are schedulable in an overlapped portion of the first COT and the second COT and in a non-overlapped portion of the first COT or the second COT.

In some implementations, one or more control transmissions and one or more data transmissions are schedulable in the non-overlapped portion.

In some implementations, first transmissions including control transmissions are schedulable in a time interval of the second COT that does not overlap the first COT.

In some implementations, one of the first UE or the second UE is selected, and the one or more transmissions are schedulable for the selected UE in a corresponding COT of the first COT or the second COT.

In some implementations, only transmissions associated with the first UE or the second UE are schedulable in the first COT or the second COT.

In some implementations, the base station may perform a transmission for a third UE in the first COT or the second COT.

In some implementations, the base station may perform a broadcast transmission in the first COT or the second COT.

In some implementations, the first UE is associated with a first subband and the second UE is associated with a second subband, where respective transmissions of the first UE and the second UE are schedulable on the first subband or on the second subband.

In some implementations, an uplink transmission of the first UE ends after an uplink transmission of the second UE.

In some implementations, the base station is associated with a maximum allowable pause length, and, based on a pause after an endpoint of the uplink transmission of the first UE being less than or equal to the maximum allowable pause length or based on no pause occurring after the endpoint of the uplink transmission, the one or more transmissions are schedulable using the first COT after the endpoint of the uplink transmission of the first UE.

In some implementations, the base station is associated with a maximum allowable pause length, and, based on a pause after an endpoint of the uplink transmission of the first UE being less than or equal to the maximum allowable pause length or based on no pause occurring after the endpoint of the uplink transmission, a transmission is schedulable for the second UE in the first COT after the endpoint of the uplink transmission of the first UE.

In some implementations, based on a pause of a threshold length being configured after an endpoint of the uplink transmission of the second UE, respective transmissions of the first UE and the second UE are schedulable in the first COT or the second COT.

In some implementations, when a pause of a threshold length is not performed after an endpoint of the uplink transmission, a transmission of only the first UE is schedulable in the first COT.

In some implementations, the base station is associated with a maximum allowable pause length, and, based on a pause after an endpoint of the uplink transmission of the second UE being less than or equal to the maximum allowable pause length or based on no pause occurring after the endpoint of the uplink transmission of the second UE, a data transmission or a control transmission of the second UE is schedulable in the first COT.

In some implementations, the first UE is associated with a first transmission of the one or more transmissions, and the second UE is associated with a second transmission of the one or more transmissions, where the first transmission and the second transmission are schedulable using the first COT after an endpoint of the uplink transmission of the first UE, and where the first transmission and the second transmission are schedulable in the first COT or second COT after a pause of a threshold length has elapsed, and where the pause is after an endpoint of the uplink transmission of the second UE.

In some implementations, respective transmissions for the first UE and the second UE are schedulable after an endpoint of the uplink transmission of the first UE in the first COT or second COT based on a listen-before-talk (LBT) operation being performed after the endpoint of the uplink transmission of the first UE.

In some implementations, the base station may determine whether the listen-before-talk operation is to be performed or determining a configuration for the listen-before-talk operation, where scheduling the one or more transmissions is based on whether the listen-before-talk operation is performed or based on the configuration for the listen-before-talk operation.

In some implementations, the uplink transmission of the first UE and the uplink transmission of the second UE are non-overlapped with each other.

In some implementations, the base station may determine whether to schedule the one or more transmissions based on the first COT, the second COT, or a combination thereof.

In some implementations, the first UE and the second UE are included in a plurality of UEs associated with respective COTs that at least partially overlap with each other.

In some implementations, a portion of the one or more transmissions is scheduled in an overlapped portion of the first COT and the second COT.

Another innovative aspect of the subject matter described in this disclosure can be implemented in an apparatus of a BS for wireless communication. The BS may include memory and one or more processors operatively coupled to the memory. The memory and the one or more processors may be configured to schedule one or more transmissions for at least one of: a first user equipment (UE) that is associated with a first channel occupancy time (COT), or a second UE that is associated with a second COT, where the first COT at least partially overlaps with the second COT, and where the first COT and the second COT include shared COTs; and output the one or more transmissions.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a BS, may cause the one or more processors to schedule one or more transmissions for at least one of: a first user equipment (UE) that is associated with a first channel occupancy time (COT), or a second UE that is associated with a second COT, where the first COT at least partially overlaps with the second COT, and where the first COT and the second COT include shared COTs; and output the one or more transmissions.

Another innovative aspect of the subject matter described in this disclosure can be implemented in an apparatus for wireless communication. The apparatus may include means for scheduling one or more transmissions for at least one of: a first user equipment (UE) that is associated with a first channel occupancy time (COT), or a second UE that is associated with a second COT, where the first COT at least partially overlaps with the second COT, and where the first COT and the second COT include shared COTs; and means for outputting the one or more transmissions.

Another innovative aspect of the subject matter described in this disclosure can be implemented in a method of wireless communication performed by an apparatus of a user equipment (UE). The method may include obtaining scheduling information for one or more transmissions, where the one or more transmissions are for at least one of the first UE or a second UE, where the first UE is associated with a first channel occupancy time (COT) and the second UE is associated with a second COT that at least partially overlaps with the first COT, and where the first COT and the second COT include shared COTs; and communicating in accordance with the scheduling information.

In some implementations, the first COT and the second COT include shared COTs.

In some implementations, the portion of the one or more transmissions is a first part, where a second portion of the one or more transmissions is scheduled in a time interval of the second COT that does not overlap the first COT.

In some implementations, the portion of the one or more transmissions is a first part, where a second portion of the one or more transmissions is scheduled in a sub-band of the second COT that does not overlap the first COT.

In some implementations, the scheduling information is based on respective channel access priority levels associated with the first UE and the second UE.

In some implementations, transmitting the one or more transmissions further includes receiving a particular transmission of the one or more transmissions, where a particular time gap is to elapse between an end of a transmission by the first UE and a beginning of the particular transmission.

In some implementations, the particular transmission is scheduled in the second COT.

In some implementations, the one or more transmissions are scheduled in a particular COT, of the first COT or the second COT, where the one or more transmissions include respective transmissions to the first UE and the second UE.

In some implementations, the respective transmissions are scheduled after a pause that follows an end of a last transmission by the first UE or the second UE.

In some implementations, the scheduling information is based on a shortened first COT, where the shortened first COT is shortened based on an uplink or downlink transmission associated with the second UE.

In some implementations, the uplink or downlink transmission is performed in a pause of a base station that is associated with the first UE after the transmission endpoint of the first UE.

In some implementations, the first COT and the second COT have a same start time.

In some implementations, the one or more transmissions include a first transmission for the first UE and a second transmission for the second UE, where the first transmission is schedulable in the first COT and the second transmission is schedulable in the second COT, and where the first transmission and the second transmission are schedulable in an overlapped portion of the first COT and the second COT.

In some implementations, the one or more transmissions include a first transmission for the first UE and a second transmission for the second UE, where the first transmission and the second transmission are schedulable in an overlapped portion of the first COT and the second COT, and where the first transmission and the second transmission are not schedulable in a non-overlapped portion of the first COT or the second COT.

In some implementations, the one or more transmissions include a first transmission for the first UE and a second transmission for the second UE, where the first transmission and the second transmission are schedulable in an overlapped portion of the first COT and the second COT, and in a non-overlapped portion of the first COT or the second COT.

In some implementations, control transmissions and data transmissions are schedulable in the non-overlapped portion.

In some implementations, first transmissions including control transmissions are schedulable in a time interval of the second COT that does not overlap the first COT.

In some implementations, the first UE is a selected UE, of the first UE or the second UE, for which the one or more transmissions are to be scheduled, where the one or more transmissions are schedulable for the selected UE in a corresponding COT of the first COT or the second COT.

In some implementations, only transmissions associated with the first UE or the second UE are schedulable in the first COT or the second COT.

In some implementations, the first UE may receive a broadcast transmission in the first COT or the second COT.

In some implementations, the first UE is associated with a first subband and the second UE is associated with a second subband, where respective transmissions of the first UE and the second UE are schedulable on the first subband or on the second subband.

In some implementations, an uplink transmission of the first UE ends after an uplink transmission of the second UE.

In some implementations, the one or more transmissions are schedulable only for the first UE in the first COT after an endpoint of the uplink transmission and when no pause, of a threshold length, is to be performed after the endpoint of the uplink transmission.

In some implementations, when a pause of a threshold length is performed after an endpoint of the uplink transmission, respective transmissions of the first UE and the second UE are schedulable in the first COT or the second COT.

In some implementations, when a pause of a threshold length is not performed after an endpoint of the uplink transmission, a transmission of only the first UE is schedulable in the first COT.

In some implementations, when a pause of a threshold length is not performed after an endpoint of the uplink transmission, a data transmission or a control transmission of the first UE, or a control transmission of the second UE, is schedulable in the first COT.

In some implementations, the first UE is associated with a first transmission of the one or more transmissions, and the second UE is associated with a second transmission of the one or more transmissions, where the first transmission is schedulable using the first COT after an endpoint of the uplink transmission of the first UE, and where the first transmission and the second transmission are schedulable in the first COT or second COT after a pause of a threshold length has elapsed after an endpoint of the uplink transmission of the second UE.

In some implementations, respective transmissions for the first UE and the second UE are schedulable after an endpoint of the uplink transmission of the first UE in the first COT or second COT when a listen-before-talk operation is performed after the endpoint of the uplink transmission of the first UE.

In some implementations, the uplink transmission of the first UE and the uplink transmission of the second UE are non-overlapped with each other.

In some implementations, the first UE and the second UE are included in a plurality of UEs associated with respective COTs that at least partially overlap with each other.

In some implementations, a portion of the one or more transmissions is scheduled in an overlapped portion of the first COT and the second COT.

Another innovative aspect of the subject matter described in this disclosure can be implemented in an apparatus of a UE for wireless communication. The UE may include memory and one or more processors operatively coupled to the memory. The memory and the one or more processors may be configured to obtain scheduling information for one or more transmissions, where the one or more transmissions are for at least one of the first UE or a second UE, where the first UE is associated with a first channel occupancy time (COT) and the second UE is associated with a second COT that at least partially overlaps with the first COT, and where the first COT and the second COT include shared COTs; and communicate in accordance with the scheduling information.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to obtain scheduling information for one or more transmissions, where the one or more transmissions are for at least one of the first UE or a second UE, where the first UE is associated with a first channel occupancy time (COT) and the second UE is associated with a second COT that at least partially overlaps with the first COT, and where the first COT and the second COT include shared COTs; and communicate in accordance with the scheduling information.

Another innovative aspect of the subject matter described in this disclosure can be implemented in an apparatus for wireless communication. The apparatus may include means for obtaining scheduling information for one or more transmissions, where the one or more transmissions are for at least one of the first UE or a second UE, where the first UE is associated with a first channel occupancy time (COT) and the second UE is associated with a second COT that at least partially overlaps with the first COT, and where the first COT and the second COT include shared COTs; and means for communicating in accordance with the scheduling information.

Aspects generally include a method, apparatus, system, computer program product, non-transitory computer-readable medium, user equipment, base station, wireless communication device, and processing system as substantially described herein with reference to and as illustrated by the accompanying drawings.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 19 is a diagram illustrating an example process performed, for example, by a UE.

Like reference numbers and designations in the various drawings indicate like elements.

DETAILED DESCRIPTION

Figure 1:
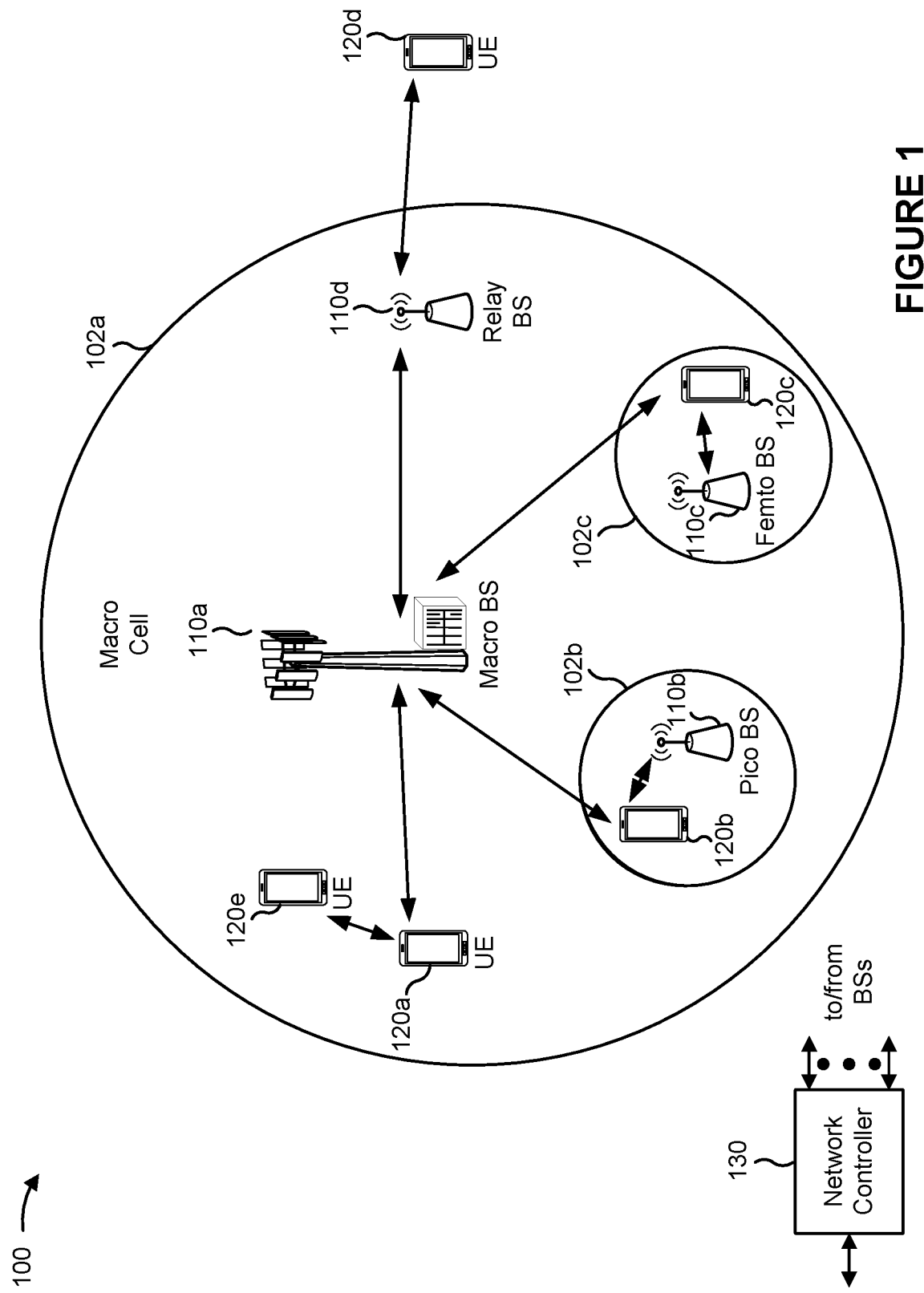
FIG. 1 is a block diagram conceptually illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

A wireless node, such as a user equipment (UE), may perform a listen-before-talk (LBT) operation to gain access to an unlicensed channel. When the LBT operation is successful, the UE may gain access to the unlicensed channel for a length of time referred to as a channel occupancy time (COT). During the COT, the UE can perform uplink transmissions without performing additional LBT operations. The duration of the COT may be dependent on the type of LBT operation and LBT parameters used for the LBT operation. In some cases, a UE may share a COT with the UE's serving base station (BS) for subsequent downlink (DL) transmissions of the base station. In such a case, the UE may indicate parameters of the COT to the base station, and the base station may be permitted to perform a downlink transmission using a short LBT operation if the base station performs the downlink transmission within a certain length of time (such as approximately 20-30 microseconds (us)) after an endpoint of uplink transmission to the UE. In some cases, a regulation may indicate that the base station is to transmit signals relevant only to the UE that has shared the COT, though in other cases, the base station may not be restricted to transmitting signals relevant solely to the UE that shared the COT.

In some cases, two or more UEs may access a channel using respective LBT operations, and may acquire at least partially overlapping COTs. For example, two or more UEs that have adjacent or the same time domain radio resources may acquire the channel. These two or more UEs may share their COTs with a base station that serves the two or more UEs. As a first example, described in connection with FIGS. 3-8, the UEs may access the channel at different times or with different LBT parameters, which may mean that the UEs are associated with COTs that are at least partially non-overlapped with each other. As a second example, described in connection with FIGS. 9-17, the uplink transmissions of the UEs might end at different times, leading to different gaps between uplink transmissions of the UEs and a downlink transmission of the base station. In such a case, since the LBT configuration to be used for the downlink transmission of the base station may be based on the length of the gap, there may be ambiguity as to which LBT configuration is to be used for the downlink transmission and which UE(s) is schedulable for the downlink transmission.

Some techniques and apparatuses described herein provide COT sharing arrangements for the case when two or more UE shared COTs are associated with different durations, and provide arrangements for scheduling downlink transmissions and selecting an LBT configuration when two or more UE shared COTs are associated with different UE transmission endpoints.

Particular implementations of the subject matter described in this disclosure can be implemented to realize one or more of the following potential advantages. By providing COT sharing arrangements for the case when two or more UE shared COTs are associated with different durations, unlicensed channel utilization may be improved and throughput may be increased relative to a case where only one UE's COT can be used by the base station. By providing arrangements for scheduling downlink transmissions and selecting an LBT configuration, unlicensed channel utilization (for example, for 5G Unlicensed (5GU) or the like) may be improved and access to the unlicensed medium may be streamlined. By providing arrangements of pause duration within shared COTs, more flexibility may be ensured for the base station to schedule transmissions, hence reducing implementation complexity.

FIG. 1 is a block diagram conceptually illustrating an example of a wireless network 100. The wireless network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and also may be referred to as a base station, a NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

Wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110d may communicate with macro BS 110a and a UE 120d in order to facilitate communication between BS 110a and UE 120d. A relay station also may be referred to as a relay BS, a relay base station, a relay, etc.

Wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. Network controller 130 may communicate with the BSs via a backhaul. The BSs also may communicate with one another, for example, directly or indirectly via a wireless or wireline backhaul.

UEs 120 (for example, 120a, 120b, 120c) may be dispersed throughout wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). UE 120 may be included inside a housing that houses components of UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the base station 110.

Figure 2:
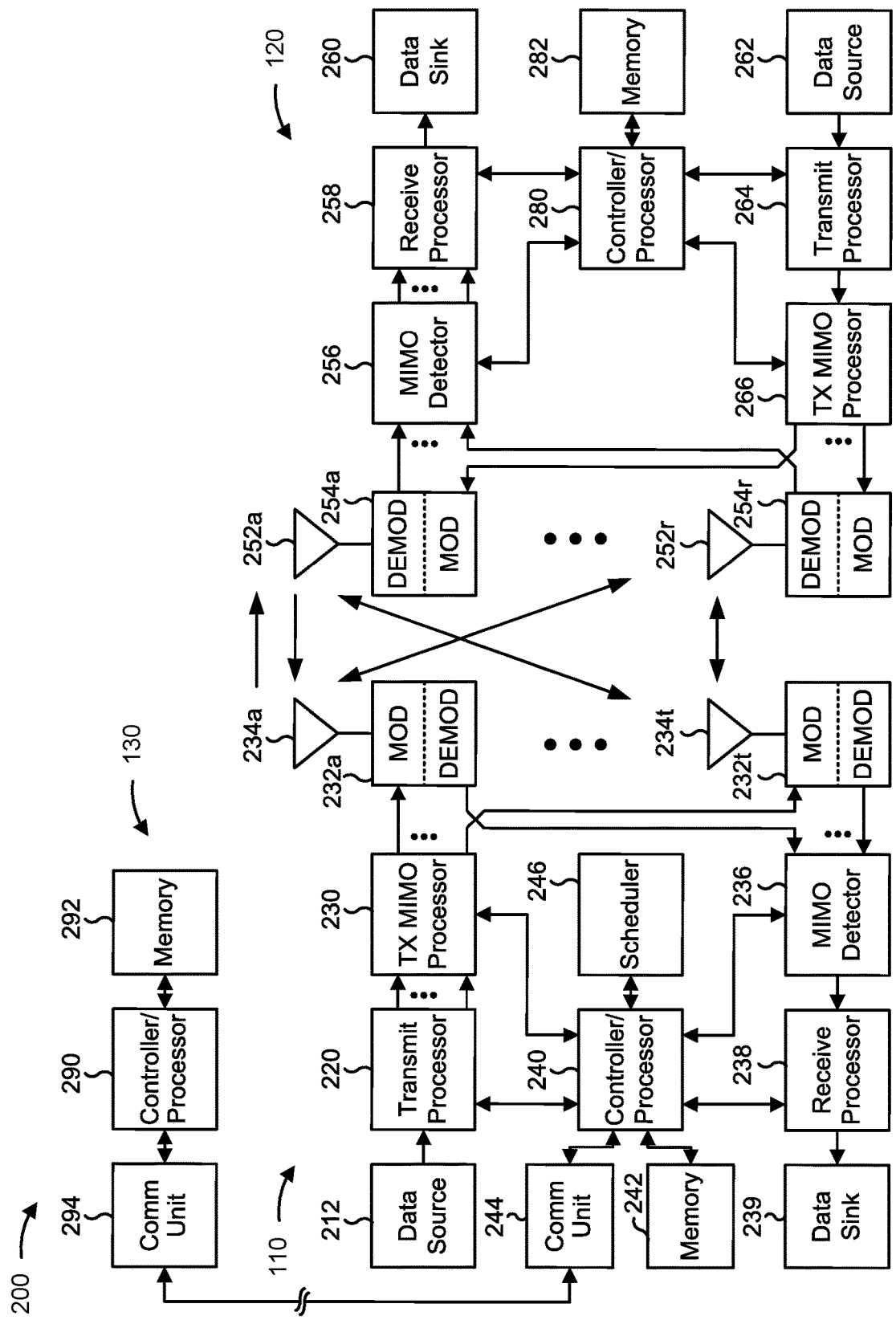
FIG. 2 is a block diagram conceptually illustrating an example of a base station (BS) in communication with a user equipment (UE) in a wireless network.

FIG. 2 is a block diagram conceptually illustrating an example 200 of a base station 110 in communication with a UE 120. In some aspects, base station 110 and UE 120 may respectively be one of the base stations and one of the UEs in wireless network 100 of FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on channel quality indicators (CQIs) received from the UE, process (for example, encode and modulate) the data for each UE based on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by modulators 254a through 254r (for example, for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The base station 110 may include communication unit 244 and communicate to network controller 130 via communication unit 244. The network controller 130 may include communication unit 294, a controller or processor (i.e., controller/processor) 290, and memory 292.

In some implementations, controller/processor 280 may be a component of a processing system. A processing system may generally refer to a system or series of machines or components that receives inputs and processes the inputs to produce a set of outputs (which may be passed to other systems or components of, for example, the UE 120). For example, a processing system of the UE 120 may refer to a system including the various other components or subcomponents of the UE 120.

The processing system of the UE 120 may interface with other components of the UE 120, and may process information received from other components (such as inputs or signals), output information to other components, etc. For example, a chip or modem of the UE 120 may include a processing system, a first interface configured to receive or obtain information, and a second interface configured to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, controller/processor 240 may be a component of a processing system. A processing system may generally refer to a system or series of machines or components that receives inputs and processes the inputs to produce a set of outputs (which may be passed to other systems or components of, for example, the BS 110). For example, a processing system of the BS 110 may refer to a system including the various other components or subcomponents of the BS 110.

The processing system of the BS 110 may interface with other components of the BS 110, and may process information received from other components (such as inputs or signals), output information to other components, etc. For example, a chip or modem of the BS 110 may include a processing system, a first interface configured to receive or obtain information, and a second interface configured to output, transmit or provide information. In some cases, the first interface may refer to an interface between the processing system of the chip or modem and a receiver, such that the BS 110 may receive information or signal inputs, and the information may be passed to the processing system. In some cases, the second interface may refer to an interface between the processing system of the chip or modem and a transmitter, such that the BS 110 may transmit information output from the chip or modem. A person having ordinary skill in the art will readily recognize that the second interface also may obtain or receive information or signal inputs, and the first interface also may output, transmit or provide information.

Controller/processor 240 of base station 110, controller/processor 280 of UE 120, or any other component(s) of FIG. 2 may perform one or more techniques associated with COT sharing, as described in more detail elsewhere herein. For example, controller/processor 240 of base station 110, controller/processor 280 of UE 120, or any other component(s) (or combinations of components) of FIG. 2 may perform or direct operations of, for example, process 1800 of FIG. 18, process 1900 of FIG. 19, or other processes as described herein. Memories 242 and 282 may store data and program codes for base station 110 and UE 120, respectively. A scheduler 246 may schedule UEs for data transmission on the downlink, the uplink, or a combination thereof.

The stored program codes, when executed by controller/processor 280 or other processors and modules at UE 120, may cause the UE 120 to perform operations described with respect to process 1900 of FIG. 19 or other processes as described herein. The stored program codes, when executed by controller/processor 240 or other processors and modules at base station 110, may cause the base station 110 to perform operations described with respect to process 1800 of FIG. 18 or other processes as described herein. A scheduler 246 may schedule UEs for data transmission on the downlink, the uplink, or a combination thereof.

In some aspects, UE 120 may include means for obtaining scheduling information for one or more transmissions, where the one or more transmissions are for at least one of UE 120 or a second UE, where the first UE is associated with a first channel occupancy time (COT) and the second UE is associated with a second COT that at least partially overlaps with the first COT, and where the first COT and the second COT include shared COTs; means for receiving at least one of the one or more transmissions; means for communicating in accordance with the scheduling information; means for receiving a particular transmission of the one or more transmissions, where a particular time gap is to elapse between an end of a transmission by the first UE and a beginning of the particular transmission; means for obtaining a broadcast transmission in the first COT or the second COT; or the like, or combinations thereof. In some aspects, such means may include one or more components of UE 120 described in connection with FIG. 2.

In some aspects, base station 110 may include means for scheduling one or more transmissions for at least one of: a first UE that is associated with a first COT, or a second UE that is associated with a second COT, where the first COT at least partially overlaps with the second COT, and where the first COT and the second COT include shared COTs; means for outputting the one or more transmissions; means for outputting a particular transmission, of the one or more transmissions, for the first UE after performing a listen-before-talk operation, where a pause is configured between an end of a transmission by the first UE and a beginning of the particular transmission using the first COT, and where the particular transmission overlaps at least in part with the second COT; means for scheduling the one or more transmissions based on a shortened first COT, where the shortened first COT is shortened based on an uplink or downlink transmission associated with the second UE; means for selecting a selected UE, of the first UE or the second UE, for which the one or more transmissions are to be scheduled, where the one or more transmissions are schedulable for the selected UE in a corresponding COT of the first COT or the second COT; means for performing a transmission for a third UE in the first COT or the second COT; means for performing a broadcast transmission in the first COT or the second COT; means for determining whether the listen-before-talk operation is to be performed or determining a configuration for the listen-before-talk operation, where scheduling the one or more transmissions is based on whether the listen-before-talk operation is performed or based on the configuration for the listen-before-talk operation; means for determining whether to schedule the one or more transmissions based on the first COT, the second COT, or a combination thereof; or the like, or combinations thereof. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3:
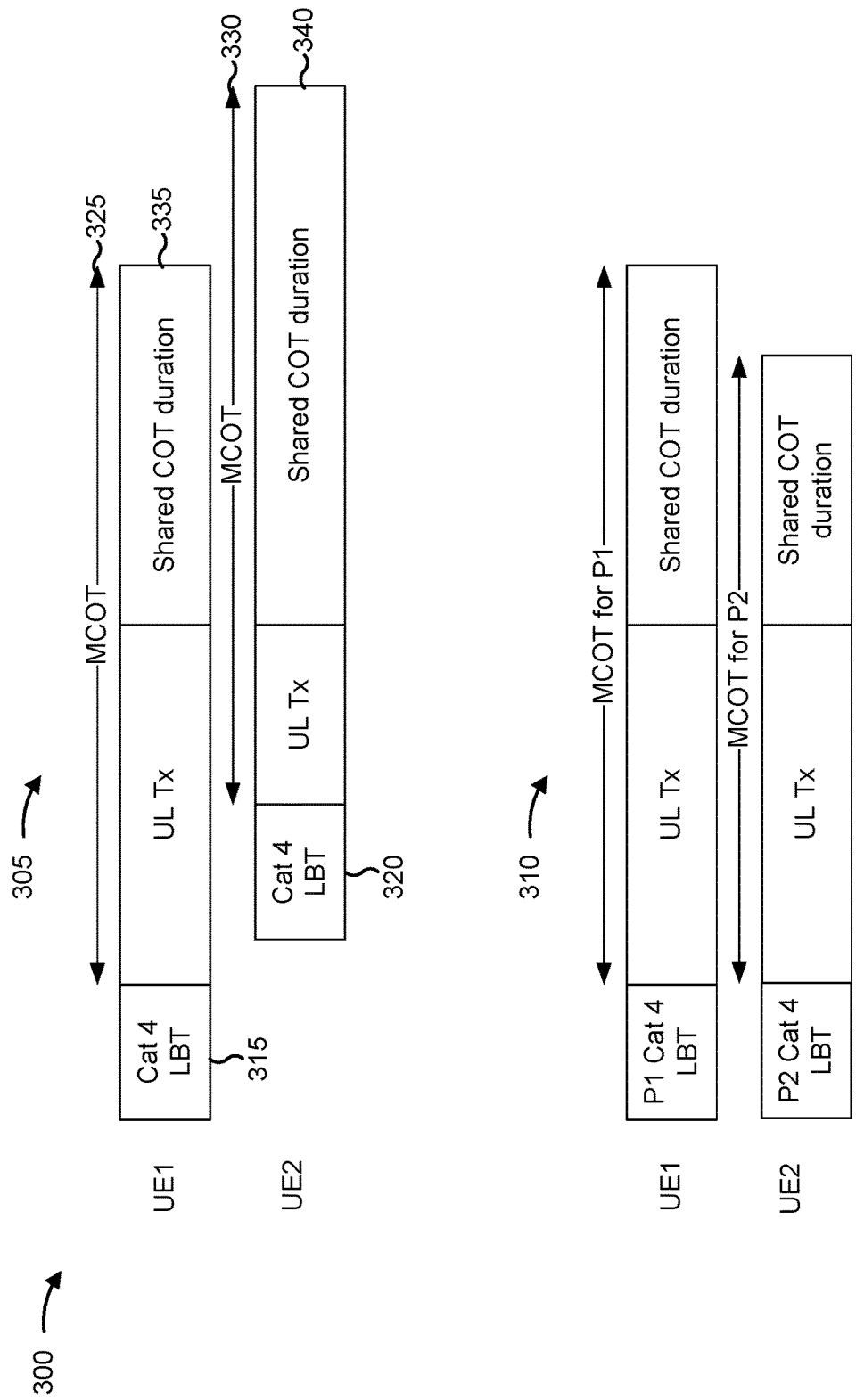
FIG. 3 is a diagram illustrating an example of partially overlapped shared channel occupancy times (COTs) with an aligned transmission endpoint.

FIG. 3 is a diagram illustrating an example 300 of partially overlapped shared channel occupancy times (COTs) with an aligned transmission endpoint. The examples described in connection with FIG. 3 involve a first UE (UE1) and a second UE (UE2). The UE1 and the UE2 may be associated with the same serving base station (BS). A first example, where the UE1 and the UE2 are associated with different COT durations based on respective transmission start points of the UE1 and the UE2, is shown by reference number 305. A second example, where the UE1 and the UE2 are associated with different COT durations based on respective LBT parameters of the UE1 and the UE2, is shown by reference number 310. In FIG. 3, time is on the horizontal axis. The UE1 and the UE2 may be associated with the same frequency resources or may be associated with different frequency resources.

Turning now to the example shown by reference number 305, the UE1 and the UE2 may perform respective Category 4 LBT operations, as shown by reference numbers 315 and 320. A Category 4 LBT operation may refer to an LBT operation with a random back-off and a variable size of contention window. The UE1 and the UE2 may gain access to the channel, and may have respective maximum COTs (MCOTs), shown by reference numbers 325 and 330.

As shown, the UE1 and the UE2 may perform respective uplink (UL) transmissions in the respective MCOTs. Here, the UL transmission of the UE1 is longer than the UL transmission of the UE2. As shown by reference numbers 335 and 340, the UE1 and the UE2 may be associated with respective remaining COT durations. Each UE can share the remaining COT duration with the serving BS. Here, the UE1's remaining COT duration is shorter than the UE2's remaining COT duration since the UE2's UL transmission was shorter than the UE1's UL transmission. The UE1's remaining COT duration is referred to herein as a first COT and the UE2's remaining COT duration is referred to herein as a second COT.

Turning now to the example shown by reference number 310, the UE1 and the UE2 may be associated with respective LBT parameters (illustrated by P1 Cat 4 LBT and P2 Cat 4 LBT in the LBT operation rectangles of the example). Because of the different LBT parameters, the UE1 and the UE2 may be associated with different MCOTs and, therefore, different COT durations that can be used for DL transmissions of the BS.

The BS may transmit to a UE in the COT duration associated with that UE without performing a Category 4 LBT operation. This is because the UE has determined that the COT duration is "safe" for the transmission and an interference level during the COT duration will be acceptable for communication. Thus, the BS may use the COT duration for DL communication. However, when multiple COT durations are associated with different time windows (for example, when the multiple COT durations partially overlap each other), then the BS may need to schedule DL communications to the UE1 or the UE2 based on the multiple COT durations partially overlapping each other. Various approaches for scheduling these DL communications are described below in connection with FIGS. 4-8.

In some aspects, the BS may transmit or receive a transmission for the UE1 in a remaining COT duration of the UE1 and may transmit or receive a transmission for the UE2 in a remaining COT duration of the UE2. In other words, a first transmission for the UE1 is schedulable in a first COT (corresponding to the UE1) and a second transmission for the UE2 is schedulable in a second COT (corresponding to the UE2). Furthermore, in such a case, the first transmission and/or the second transmission is schedulable in an overlapped portion of the first COT and the second COT. In some aspects, the BS may schedule communications according to the channel access priority of a lower-channel access priority class UE in an overlapped portion of COTs of the UE1 and the UE2.

Figure 4:
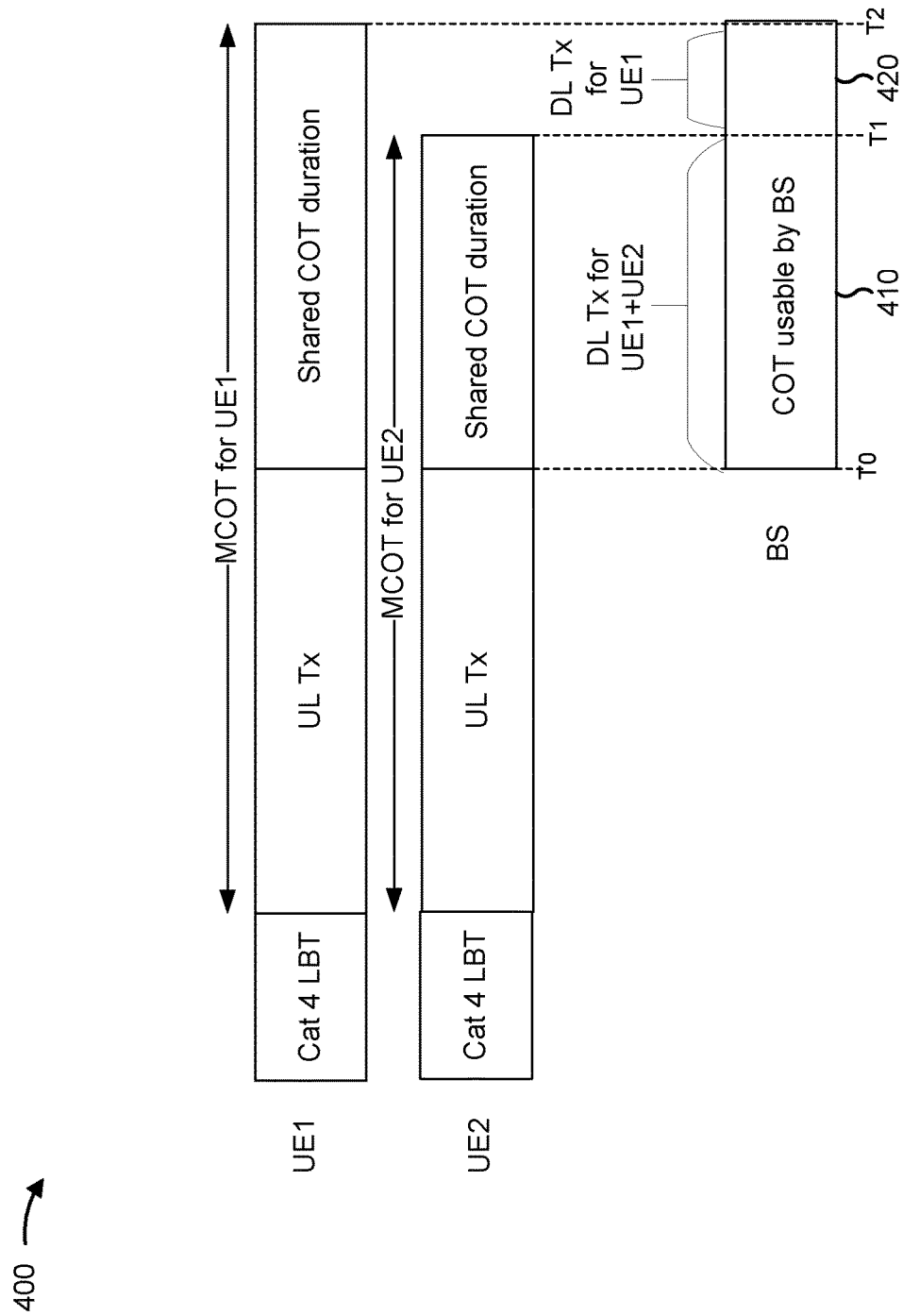
FIGS. 4-8 are diagrams illustrating examples of scheduling approaches for partially overlapped shared COTs.

FIG. 4 shows an example 400 of this configuration. As shown by reference number 410, in a first time range of T0 through T1, where the remaining COT for the UE1 and the remaining COT for the UE2 overlap with each other, the BS can schedule DL transmissions for the UE1 and the UE2. As shown by reference number 420, in a second time range of T1 through T2, where the remaining COT of the UE2 has elapsed and only the remaining COT of the UE1 continues, the BS can schedule DL transmissions for the UE1. In this case, if a slot or symbol belongs to a shared COT of the UE1, then the BS can schedule traffic for the UE1 in that slot or symbol (in other words, the BS can serve the UE1 in that slot or symbol). Similarly, if a slot or symbol belongs to a shared COT of the UE2, then the BS can schedule traffic for the UE2 in that slot or symbol. If a slot or symbol belongs to shared COTs of multiple UEs, then the BS can schedule traffic for any of the multiple UEs in that slot or symbol. In some aspects, the BS may support reception (such as UL reception) from the UE in the shared COT. In such a case, to receive from the UE, the BS may support multiple switching points (such as UL/DL switching points) in which the BS shares the COT with the UE.

In some aspects, the BS may schedule communications for the UE1 and the UE2 in only the overlapped portion of the first COT and the second COT. In other words, a first transmission for the UE1 and a second transmission for the UE2 is schedulable in an overlapped portion of the first COT and the second COT, and the first transmission or the second transmission are not schedulable in a non-overlapped portion of the first COT or the second COT. In some aspects, the BS may schedule communications according to the channel access priority of a lowest-possible priority class for all UEs associated with the COT.

Figure 5:
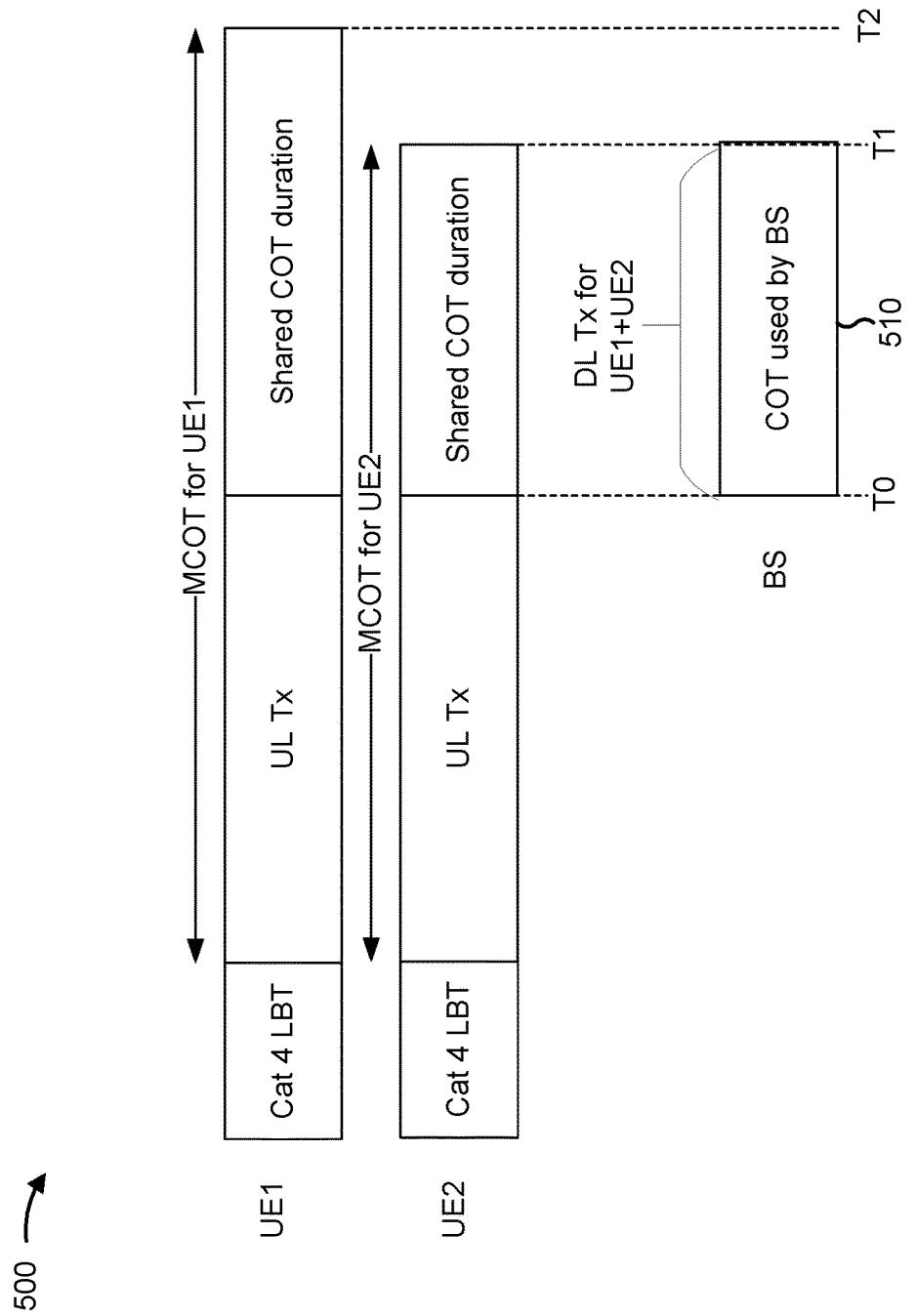
Figure 6:
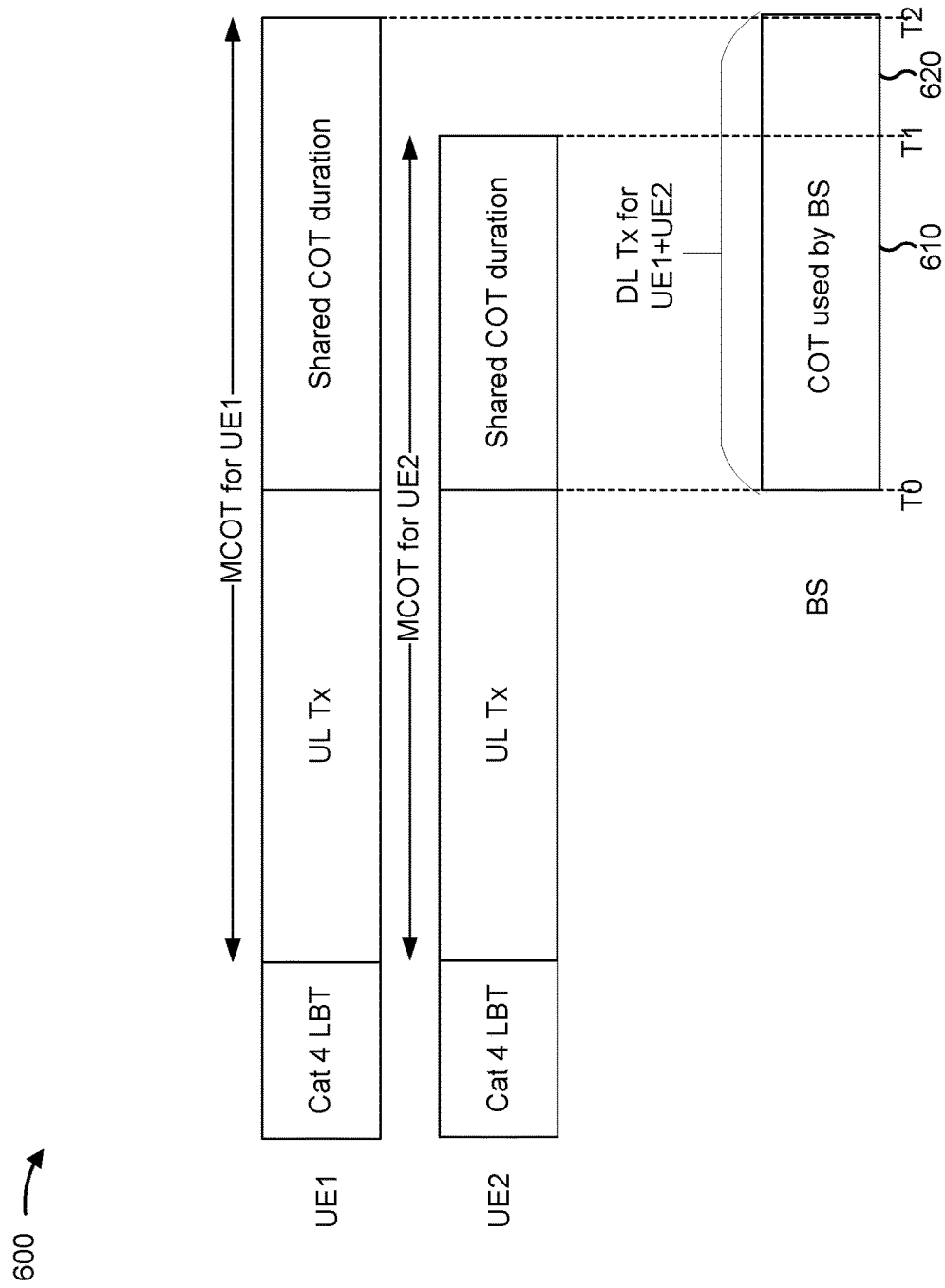

An example of this configuration is illustrated by example 500 of FIG. 5. As shown by reference number 510, DL transmissions for the UE1 and the UE2 is schedulable in the overlapped portion of the first COT and the second COT. As further shown, no communication for the UE1 or the UE2 is scheduled after the end of the second COT (since this is not an overlapped portion of the first COT and the second COT). In other words, if the shared COTs of UEs partially overlap, then the BS may only use the overlapping portion to serve the UEs.

In some aspects, the BS may schedule communications for both UEs in either COT. An example of this configuration is illustrated by example 600 of FIG. 6. As shown in example 600 of FIG. 6, and by reference number 610, the BS may schedule communications for the UE1 and for the UE2 in the union of the first COT and the second COT. In other words, communications for the UE2 is schedulable in the first COT of the UE1. In this case, the BS may schedule communications according to the channel access priority class corresponding to a UE associated with the longest COT. As another example, a first transmission for the UE1 and a second transmission for the UE2 is schedulable in an overlapped portion of the first COT and the second COT and in a non-overlapped portion of the first COT or the second COT. In this case, the BS may schedule communications according to the channel access priority corresponding to a highest-possible priority class for all UEs associated with the COT. In some aspects, control and data communications for the UE2 is schedulable in the non-overlapping part shown by reference number 620, which may improve throughput of the UE2. In some aspects, only control communications for the UE2 is schedulable in the non-overlapping part shown by reference number 620, which may reduce interference with other UEs or channel crowding.

In some aspects, the BS may select a selected UE, of the UE1 and the UE2, and may schedule a transmission for the selected UE in the selected UE's COT. In this case, if the shared COTs from multiple UEs overlap with each other, the BS may use the overlapped portion only for the selected UE. In some aspects, the BS may schedule a DL transmission for the UE1 according to an LBT parameter used by the UE1, and may schedule a DL transmission for the UE2 according to an LBT parameter used by the UE2. In some aspects, the BS may select the UE based on the UE associated with the COT that ends last, based on the UE with the longest COT, based on the UE with the highest priority data, based on a random or pseudorandom selection, based on a pattern, or the like.

Figure 7:
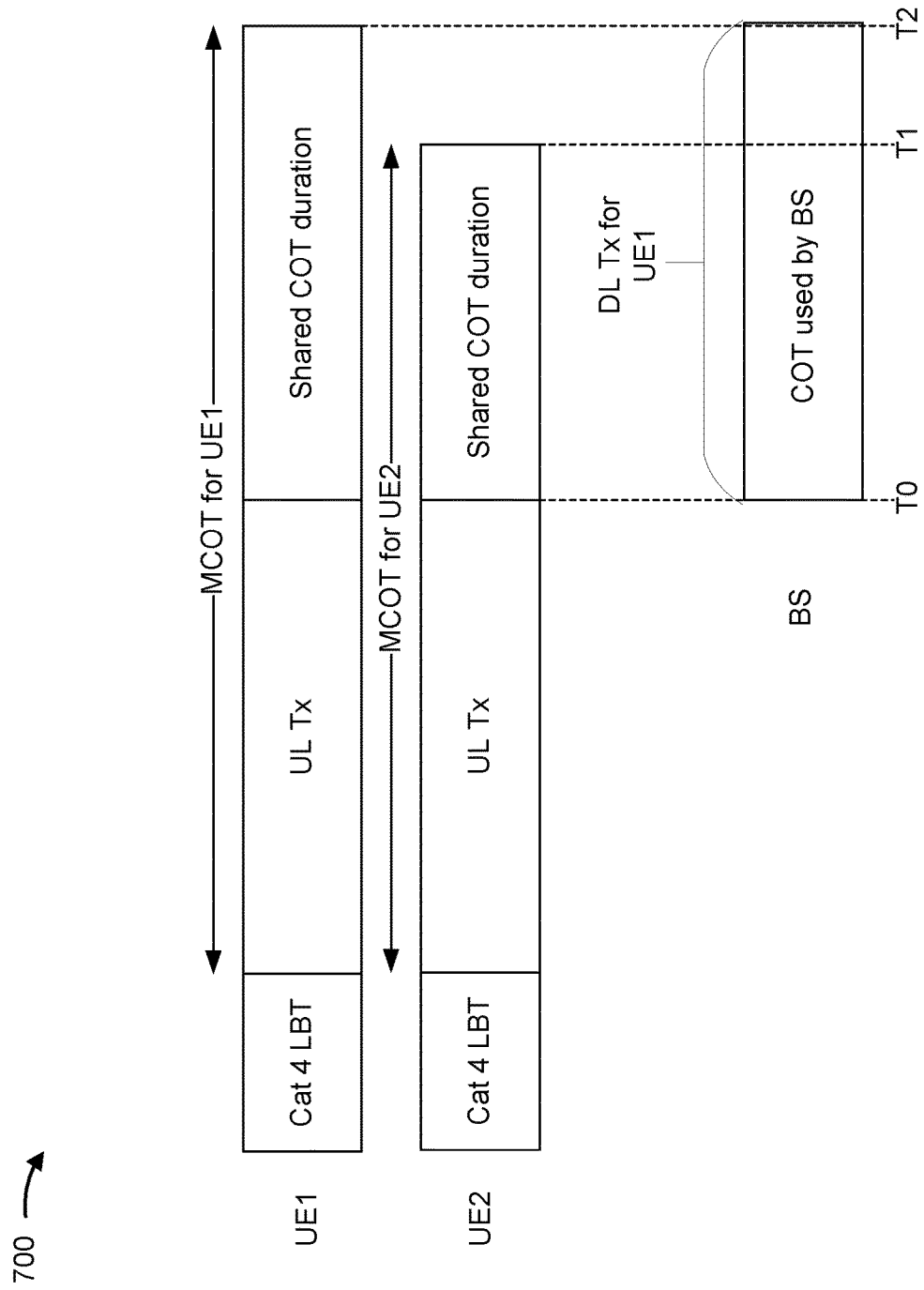

An example of this configuration is illustrated by example 700 of FIG. 7. In example 700, the UE1 is selected as the selected UE, so the BS can schedule UE1's transmission in UE1's shared COT. If UE2 were the selected UE, then the BS might schedule UE2's transmission in the COT associated with the time range T0 through T1.

Figure 8:
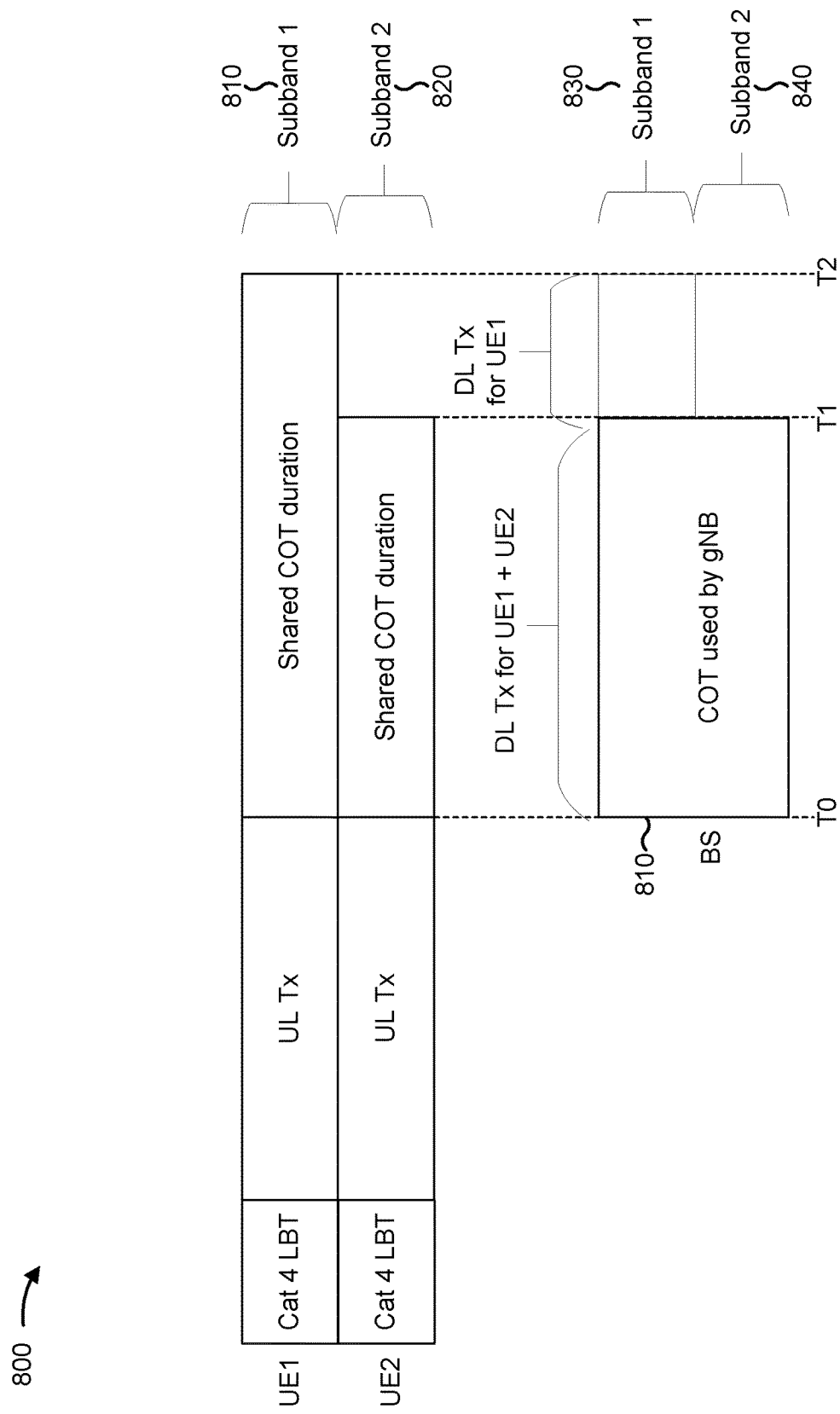

FIG. 8 shows an example 800 of scheduling communications in shared COTs based on respective subbands of the UE1 and the UE2. In some aspects, the BS may schedule transmissions for the UE1 and the UE2 based on subbands of the UE1 and the UE2. For example, as shown by reference numbers 810 and 820, in some cases, the UE1 may be associated with a first subband (shown as subband 1) and the UE2 may be associated with a second subband (shown as subband 2). In this case, as shown by reference numbers 830 and 840, the first COT associated with the UE1 may be associated with the first subband and the second COT associated with the UE2 may be associated with the second subband.

In this case, the BS may schedule transmissions to or from the UEs based on the respective subbands. As a first example, the BS may schedule transmissions for the UE1 on the first subband during the first COT and may schedule transmission for the UE2 on the second subband during the second COT. In this case, a UE's control or data transmissions may be restricted to one or more subbands that the UE has acquired and shared with the BS as part of a COT. As a second example, a UE's control or data transmission may be permitted on any subband to which the BS has access provided that the UE shares a COT with the BS on a subband.

For example, refer to reference number 810 of FIG. 8. In the first example described above, the BS may schedule the UE1's transmission on subband 1 and may schedule the UE2's transmission on subband 2. In the second example described above, the BS may schedule the UE1's transmission on subband1 or on subband 2, as long as a COT of the UE1 or the UE2 is shared with the BS on the time and frequency resources to be scheduled for the UE1.

In some aspects, a BS may schedule only control transmissions (such as for downlink control information or the like) on a COT subband other than that associated with a UE. In some aspects, a time duration for DL transmission to a UE may be restricted to a time for which the UE has shared a COT with the BS. In some aspects, control and data transmissions to a UE may be scheduled on a particular subband when multiplexed with data of other UEs when at least one UE, of the UE and the other UEs, has shared the particular subband with the BS. In some aspects, a DL transmission may be scheduled to a UE if the UE is also being served in the subband that is shared with the BS in association with the COT.

In some aspects, the BS may schedule UL or DL transmissions for a UE based on a data priority class of the UL or DL transmissions. For example, UL/DL data may be classified into different priority classes. Different LBT parameters (such as channel access priority class or the like) can be assigned to different priority classes in order to facilitate satisfaction of the different priority classes. The UL/DL data type that can be transmitted in a COT may be based on LBT parameters used for acquiring the COT. For example, if the COT is acquired using LBT parameters associated with data priority class 3, then the BS can schedule DL data of priority 1, 2, or 3 within the COT, where 1 and 2 are higher priority classes than 3.

When sharing a COT obtained by multiple UEs using respective LBT operations (which may be associated with different LBT parameters), the BS may determine a channel access priority class for transmissions to be scheduled for the multiple UEs. In a first example, the BS may schedule a DL transmission for the UE1 according to an LBT parameter (such as channel access priority) used by the UE1, and may schedule a DL transmission for the UE2 according to an LBT parameter (such as channel access priority) used by the UE2. In a second example, the BS may schedule communications according to the channel access priority of a lower-priority UE in an overlapped portion of COTs of the UE1 and the UE2. In a third example, the BS may schedule communications according to the channel access priority of a highest-possible priority class for all UEs associated with the COT. In a fourth example, the BS may schedule communications according to the channel access priority of a lowest-possible priority class for all UEs associated with the COT. In a fifth example, the BS may schedule communications according to the channel access priority of a priority class corresponding to a UE associated with the longest COT.

In some aspects, the BS may transmit information in a shared COT for a UE other than the UE1 or the UE2. For example, the BS may transmit a broadcast transmission in the shared COT, which may improve resource utilization of unlicensed channel. In some aspects, the BS may not be permitted to transmit a broadcast transmission in the shared COT, which may reduce channel crowding. In some aspects, the BS may permitted to transmit only to the UE(s) associated with the shared COTs. In other aspects, the BS may be permitted to transmit control information for other UEs other than ones associated with the shared COTs.

It should be noted that any of the priority selection techniques described herein can be used in combination with any of the aspects described in connection with FIGS. 4-8. Particular combinations of priority selection techniques have been recited in connection with particular configurations of FIGS. 4-8, but should not be considered exhaustive of the combinations contemplated herein.

Figure 9:
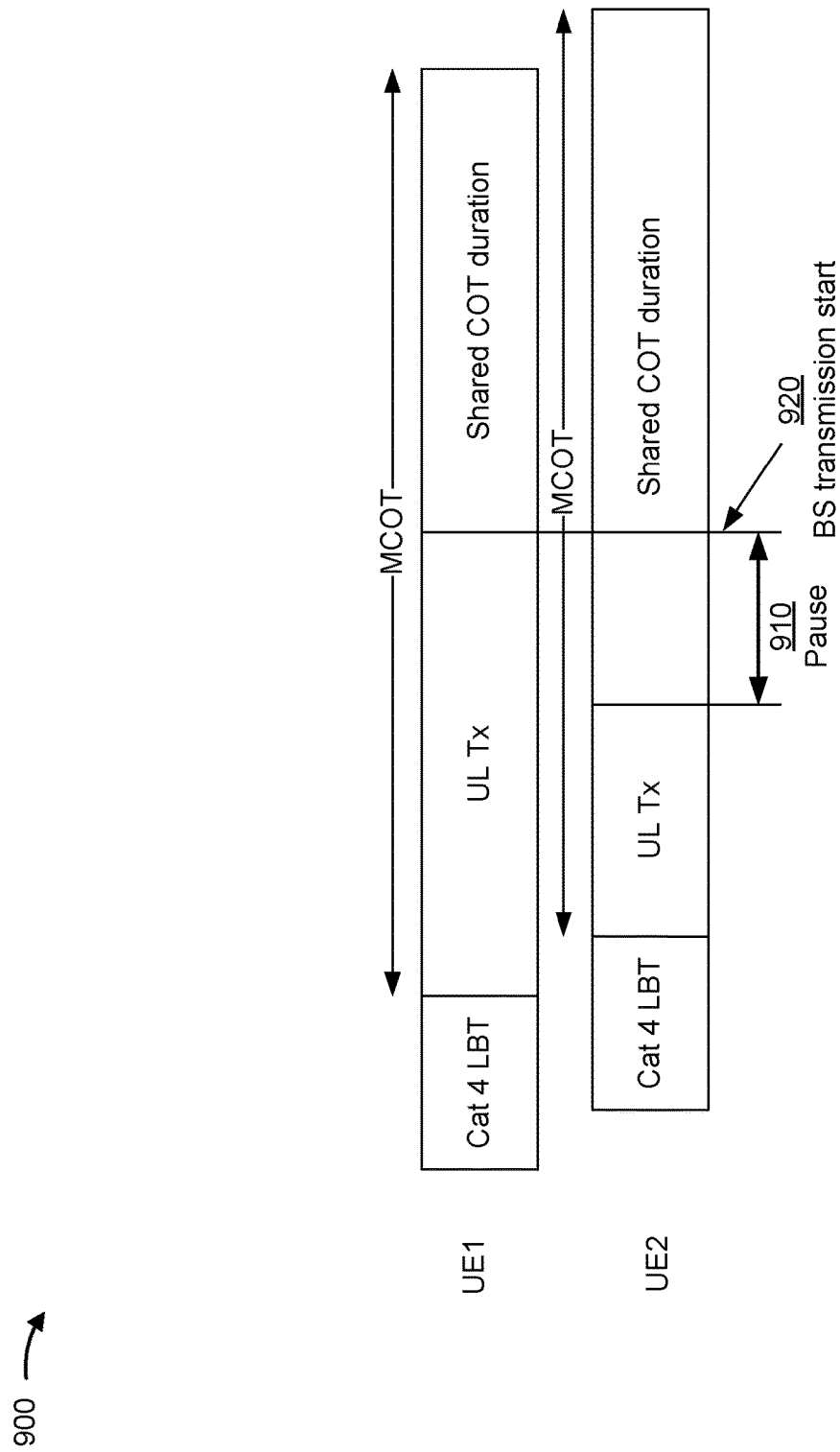
FIG. 9 is a diagram illustrating an example of partially overlapped shared channel occupancy times (COTs) with different transmission endpoints.

FIG. 9 is a diagram illustrating an example 900 of partially overlapped shared COTs with different transmission endpoints. As shown in FIG. 9, the UE1 may be associated with a first COT and the UE2 may be associated with a second COT. As further shown, UE1 and UE2 have different shared COT durations. This may be due to the different lengths of UL transmissions of the UE1 and the UE2, different LBT parameters of the UE1 and the UE2, or the like.

According to certain regulations, such as certain European Telecommunications Standards Institute (ETSI) regulations, the BS may perform a transmission within a certain length of time, referred to as a pause (shown by reference number 910 with reference to the UE2) after an endpoint of a UE's transmission without performing an LBT operation. If the BS performs the transmission after the certain length of time, then the BS may perform an LBT operation (such as a Category-2 LBT operation where BS senses the channel for certain duration without applying random backoff or the like). As one example, the maximum length of the pause may be approximately 25 microseconds or in a range of, for example, approximately 15 microseconds to approximately 50 microseconds, or approximately 5 microseconds to approximately 100 microseconds. If the BS does not transmit within the maximum length of the pause, then the BS may wait for a certain period of time (for example, at least approximately 100 microseconds), perform a Category-2 LBT operation, and then transmit to the UE.

As shown in FIG. 9, in some cases, different UEs may have different transmission endpoints. Here, the UE2's transmission ends before the UE1's transmission. Furthermore, the BS does not begin transmission until after the UE1 and the UE2 have both ended transmission (since the BS is listening to the transmissions of the UE1 and the UE2), as shown by reference number 920. Some techniques and apparatuses described herein provide configurations for BS-side scheduling or transmission in the scenario when different UEs end transmission at different times, as described in more detail in connection with FIGS. 10-17.

Figure 10:
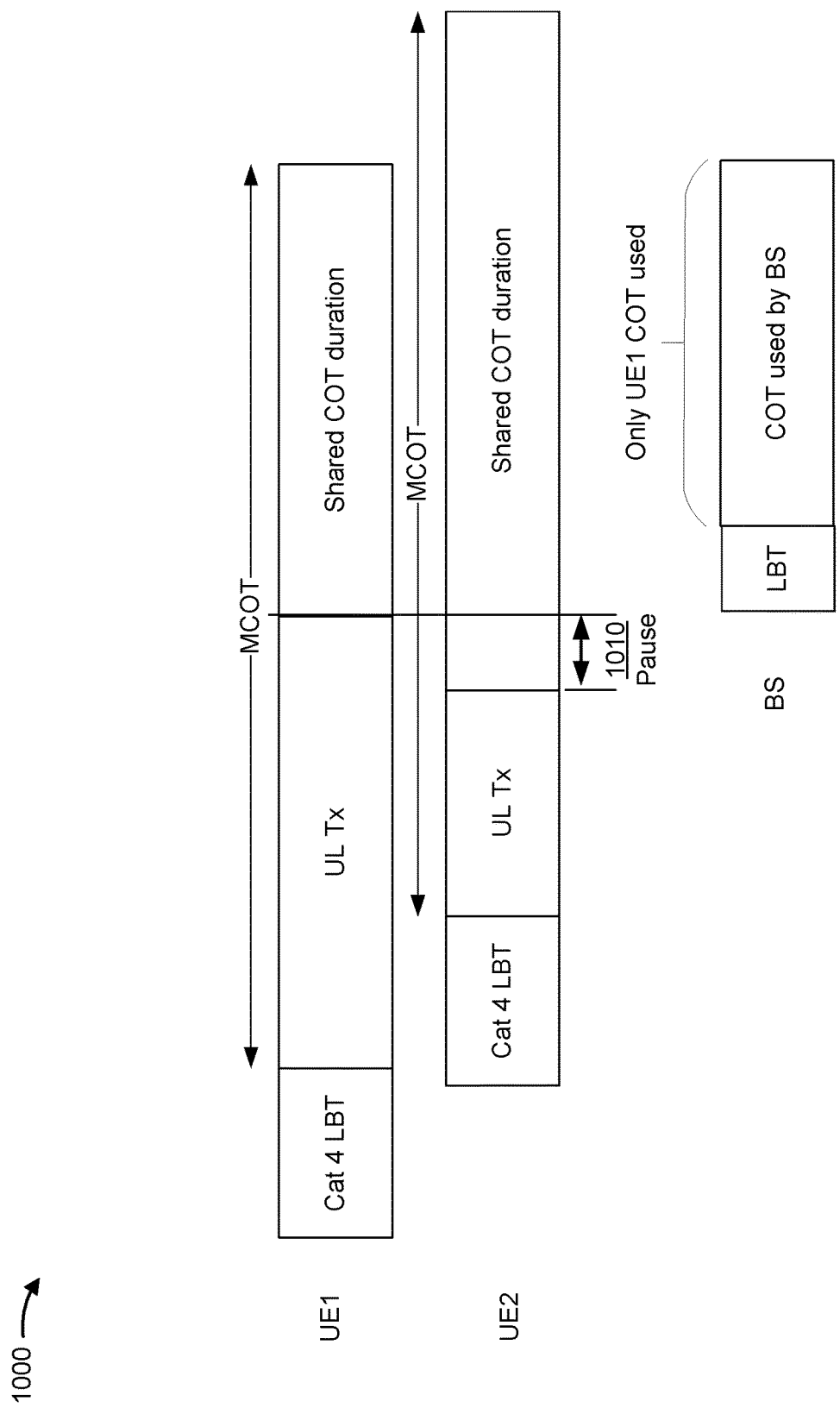
FIGS. 10-17 are diagrams illustrating examples of scheduling approaches for partially overlapped shared COTs with different transmission endpoints.

FIG. 10 illustrates an example 1000 of a scheduling approach for partially overlapped shared COTs with different transmission endpoints. In the scheduling approach shown by FIG. 10, the BS may schedule a transmission using only the UE1's COT after the UE1's transmission endpoint. In other words, the BS may not schedule a transmission using the UE2's COT if there is a pause 1010 between the UE2's transmission endpoint and the UE1's transmission endpoint and the duration of the pause is greater than a threshold (such as approximately 20-30 microseconds, like 25 microseconds). Furthermore, the BS may not schedule a transmission for the UE2 if the pause 1010 is greater than the threshold. In some aspects, the BS may schedule a control transmission for the UE2 if the pause 1010 is greater than the threshold. In some aspects, the BS may schedule both a control and a data transmission for the UE2 if the pause 1010 is greater than the threshold.

Figure 11:
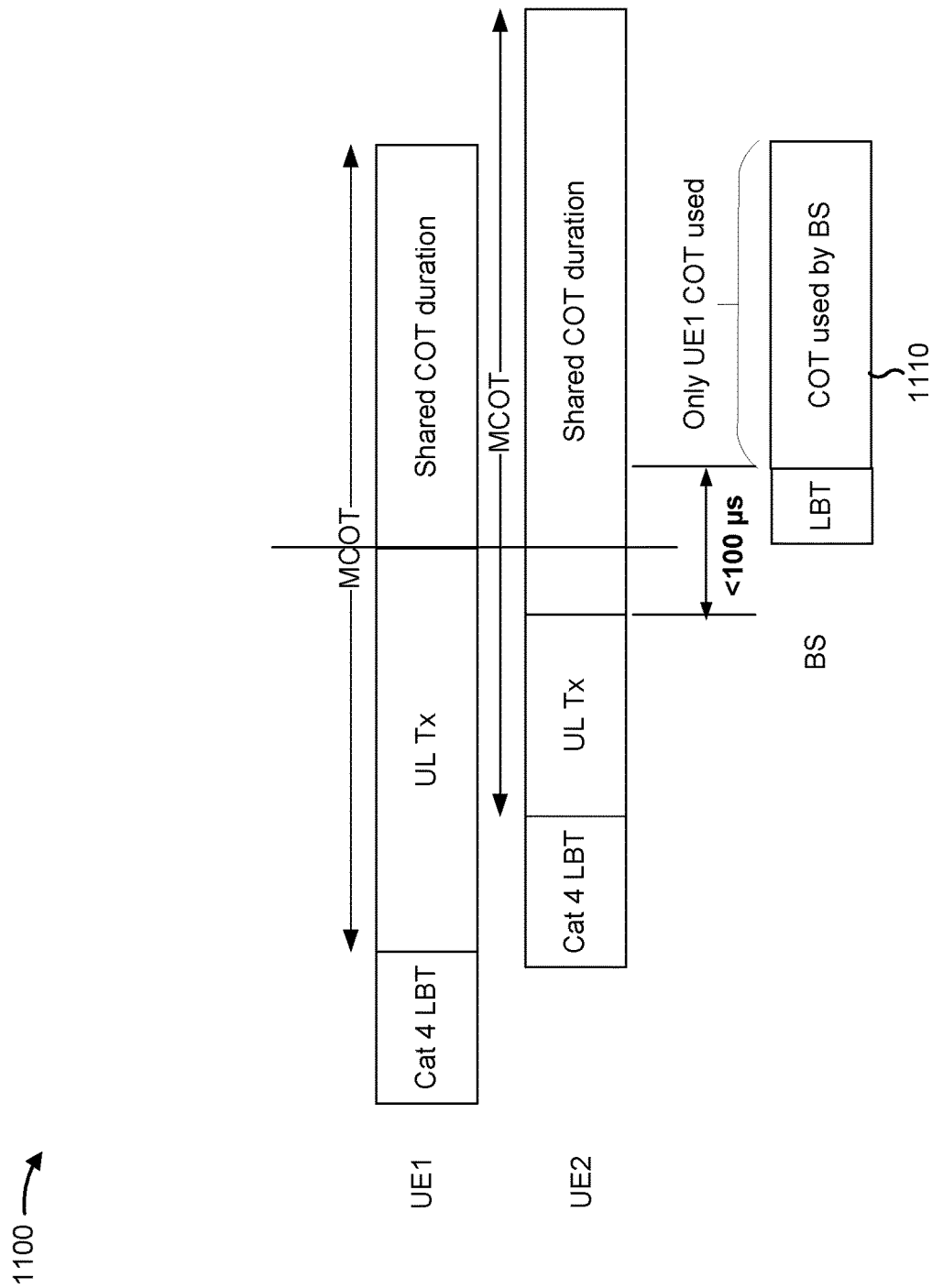
Figure 12:
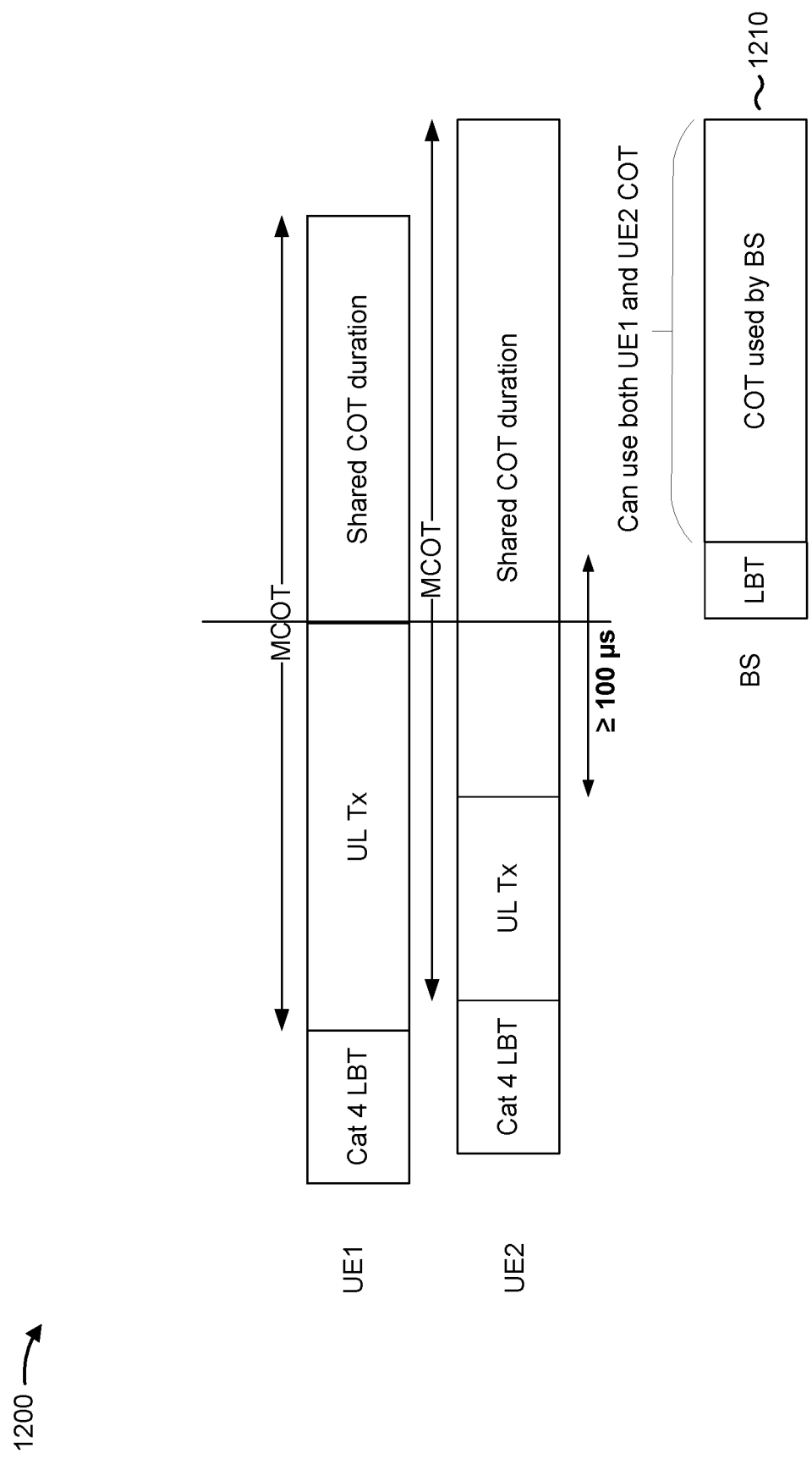

FIGS. 11 and 12 illustrate examples 1100 and 1200 of a scheduling approach for partially overlapped shared COTs with different transmission endpoints. In FIG. 11, the pause between a transmission endpoint of the UE2 and a start of the transmission of the BS is greater than a first threshold (such as approximately 25 microseconds) and is less than a second threshold (such as approximately 100 microseconds). In FIG. 12, the pause is greater than or equal to the second threshold. It should be noted that the above threshold values are provided merely as examples and may differ in implementation.

As shown in FIG. 11, and by reference number 1110, when the pause between the endpoint of the UE2's transmission and the start of the BS's transmission is greater than a first threshold (such as 25 microseconds) and less than a second threshold (such as 100 microseconds), the BS may schedule transmission using only the UE1's COT. In this case, the BS may not use the UE2's shared COT. In some aspects, the BS may not schedule a transmission for the UE2 if the pause is greater than the first threshold and less than the second threshold. In some aspects, the BS may schedule a control transmission for the UE2 if the pause is greater than the first threshold and less than the second threshold. In some aspects, the BS may schedule both control and data transmissions for the UE2 if the pause is greater than the first threshold and less than the second threshold.

As shown in FIG. 12, and by reference number 1210, when the pause between the endpoint of the UE2's transmission and the start of the BS's transmission is greater than or equal to the second threshold (such as 100 microseconds), then the BS may perform an LBT operation (such as a Category 2 LBT operation, or the like), and may schedule transmissions using the UE1's COT and the UE2's COT (assuming that the LBT operation is successful). Furthermore, if the BS determines not to perform an LBT operation, then the BS may not schedule transmissions using the UE2's COT even if pause duration is greater than the threshold. In some aspects, the BS may not schedule transmission for the UE2 if the BS has determined not to perform LBT operation.

In some aspects, the BS may schedule only control communications to the UE2 if the BS has determined not to perform an LBT operation.

Figure 13:
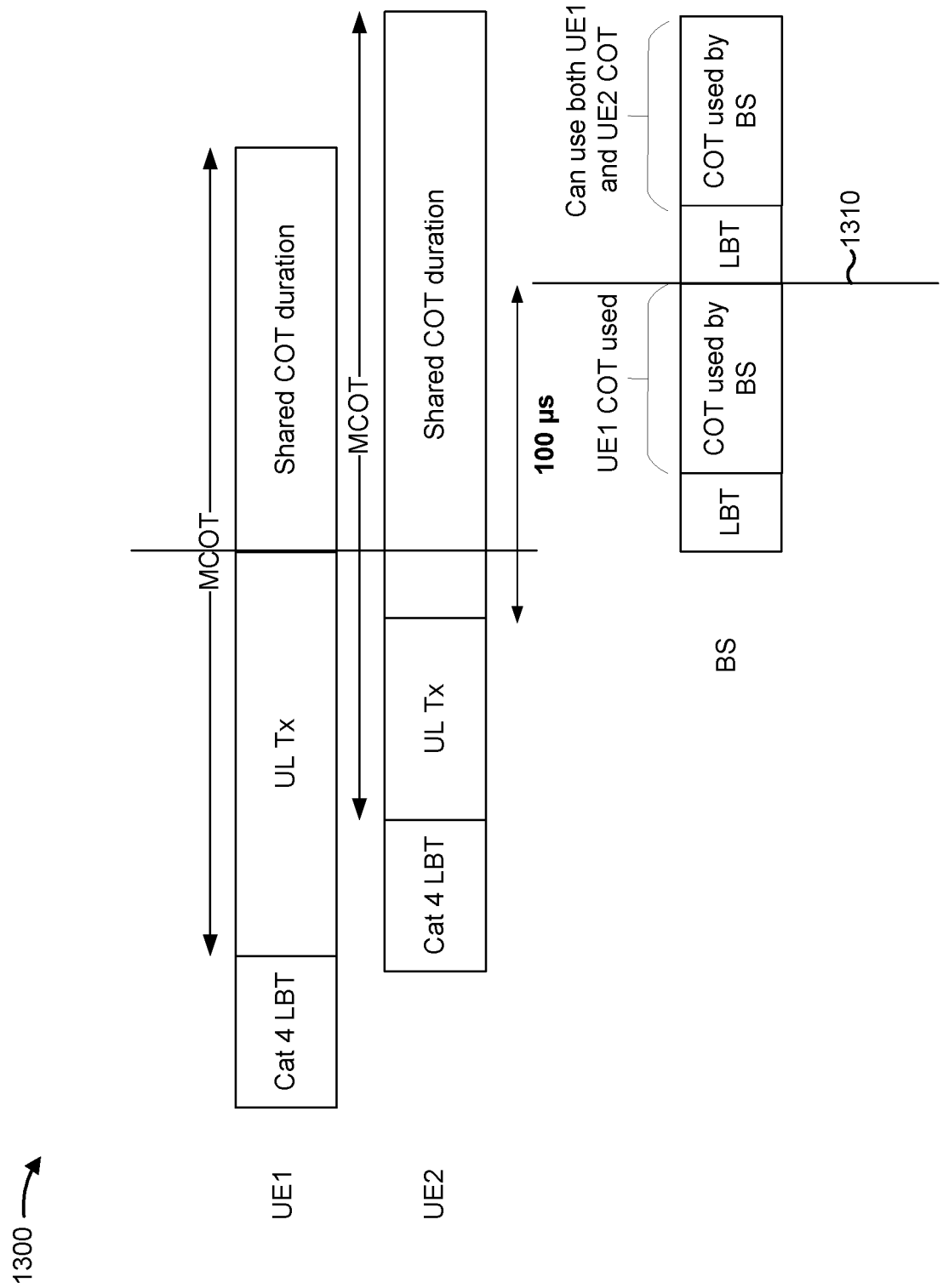

FIG. 13 illustrates an example 1300 of a scheduling approach for partially overlapped shared COTs with different transmission endpoints. In example 1300, the BS may schedule a transmission using the UE1's COT if pause duration is greater than a first threshold (such as 25 microseconds or the like) but is less than a second threshold (such as 100 microseconds or the like) after the UE2's transmission endpoint (that is, the UE2's COT may not be used for transmission scheduling), and may schedule transmissions using the UE1's COT and the UE2's COT after second threshold duration has elapsed after the UE2's transmission endpoint, as shown by reference number 1310. For example, the BS may schedule the transmission using the UE1's COT, and may schedule the transmissions to the UE1 and the UE2 on the UE1's COT and the UE2's COT, respectively. In some aspects, the BS may perform an LBT operation to schedule transmission using the UE2's COT, since the pause of the second threshold has elapsed after the UE2's transmission endpoint. In some aspects, the BS may schedule transmissions using only the UE2's COT after the LBT operation. In some aspects, the BS may schedule transmissions using only the UE2's COT if the LBT operation elapses a duration greater than a third threshold (such as 16 or 25 microseconds or the like). Furthermore, in some aspects, the BS may not schedule transmission for the UE2 when the UE2's COT is not used for a transmission scheduling. In some aspects, the BS may schedule a control transmission for the UE2 when the UE2's COT is not used for a transmission scheduling. In some aspects, the BS may schedule both a control and a data transmission for the UE2 when the UE2's COT is not used for transmission scheduling.

Figure 14:
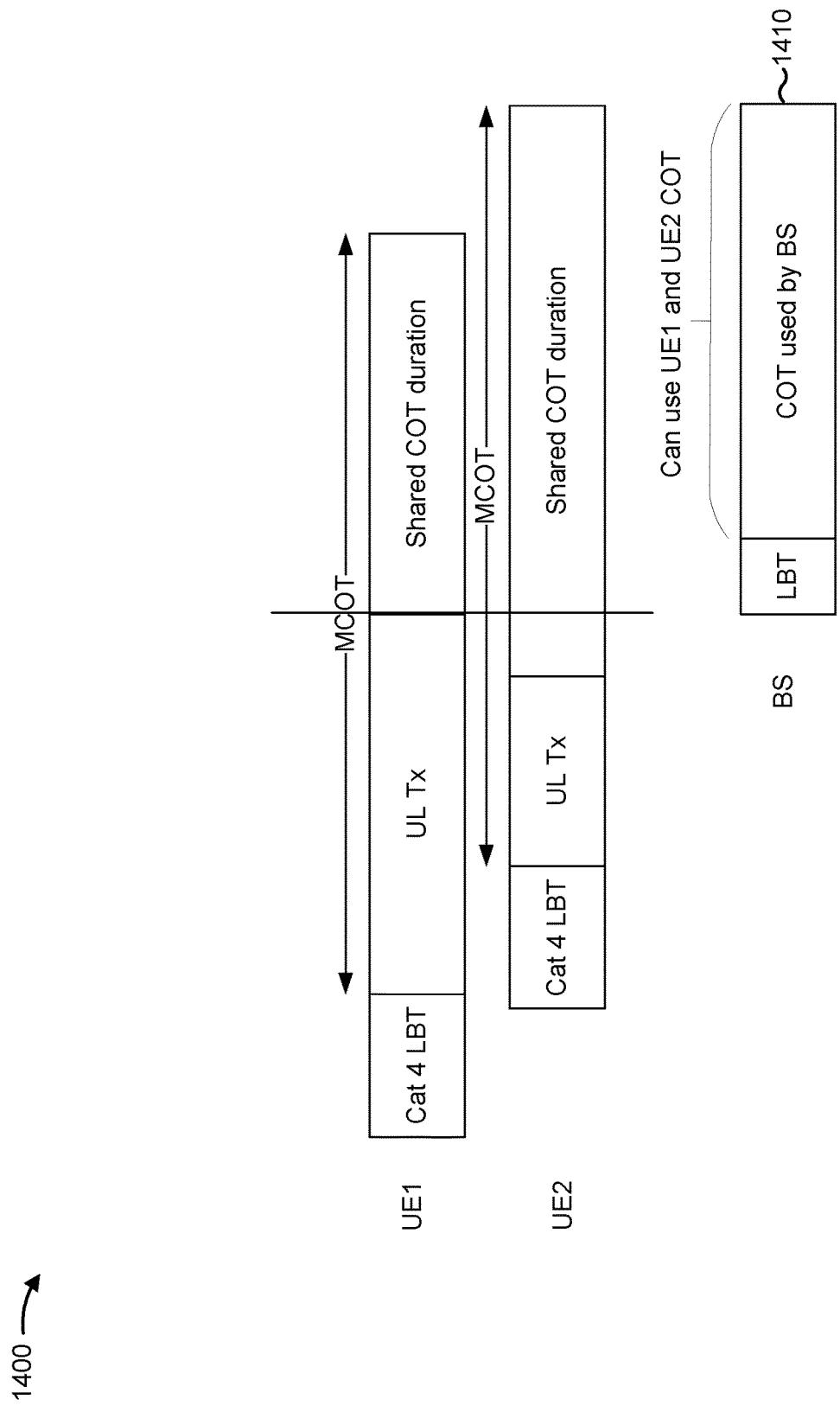

FIG. 14 illustrates an example 1400 of a scheduling approach for partially overlapped shared COTs with different transmission endpoints. In the example 1400, once the UE1's transmission ends, the BS can perform an LBT operation and can schedule transmissions using the UE1's COT and the UE2's COT after the LBT operation, as shown by reference number 1410. In some aspects, the BS may use a no-LBT approach where the BS does not perform an LBT operation. In this case, in a first example, the BS may schedule transmissions using only the UE1's COT when the no-LBT approach is used (that is, the UE2's COT is not used for a transmission scheduling). In a second example, the BS may schedule transmissions using the UE1's COT and the UE2's COT when the no-LBT approach is used. The above aspects (described in connection with FIGS. 10 through 14) can be combined with each other in many different combinations. Furthermore, in some aspects, the BS may not schedule transmission for the UE2 when the UE2's COT is not used for a transmission scheduling. In some aspects, the BS may schedule a control transmission for the UE2 when the UE2's COT is not used for a transmission scheduling. In some aspects, the BS may schedule both control and data transmissions for the UE2 when the UE2's COT is not used for a transmission scheduling. For example, the BS may select from multiple different combinations based on channel conditions, traffic conditions, or the like. The BS may schedule downlink transmissions of the UE and the UE2 based on the selected combination. Thus, flexibility of scheduling for the UE1 and the UE2 may be improved.

In some aspects, the BS may schedule transmissions for the UE1 and the UE2 using a pause after the transmission endpoints of the UE1 and the UE2. Various examples are provided in connection with FIGS. 15, 16, and 17. In some aspects, the BS may not schedule transmissions using the UE1's COT or the UE2's COT using a pause after the transmission endpoints of the UE1 and the UE2. In this case, the transmission of the BS may be configured to occur within a threshold duration (such as 25 microseconds or the like), for example, of the transmission endpoint of at least one UE that shares a COT with the BS.

Figure 15:
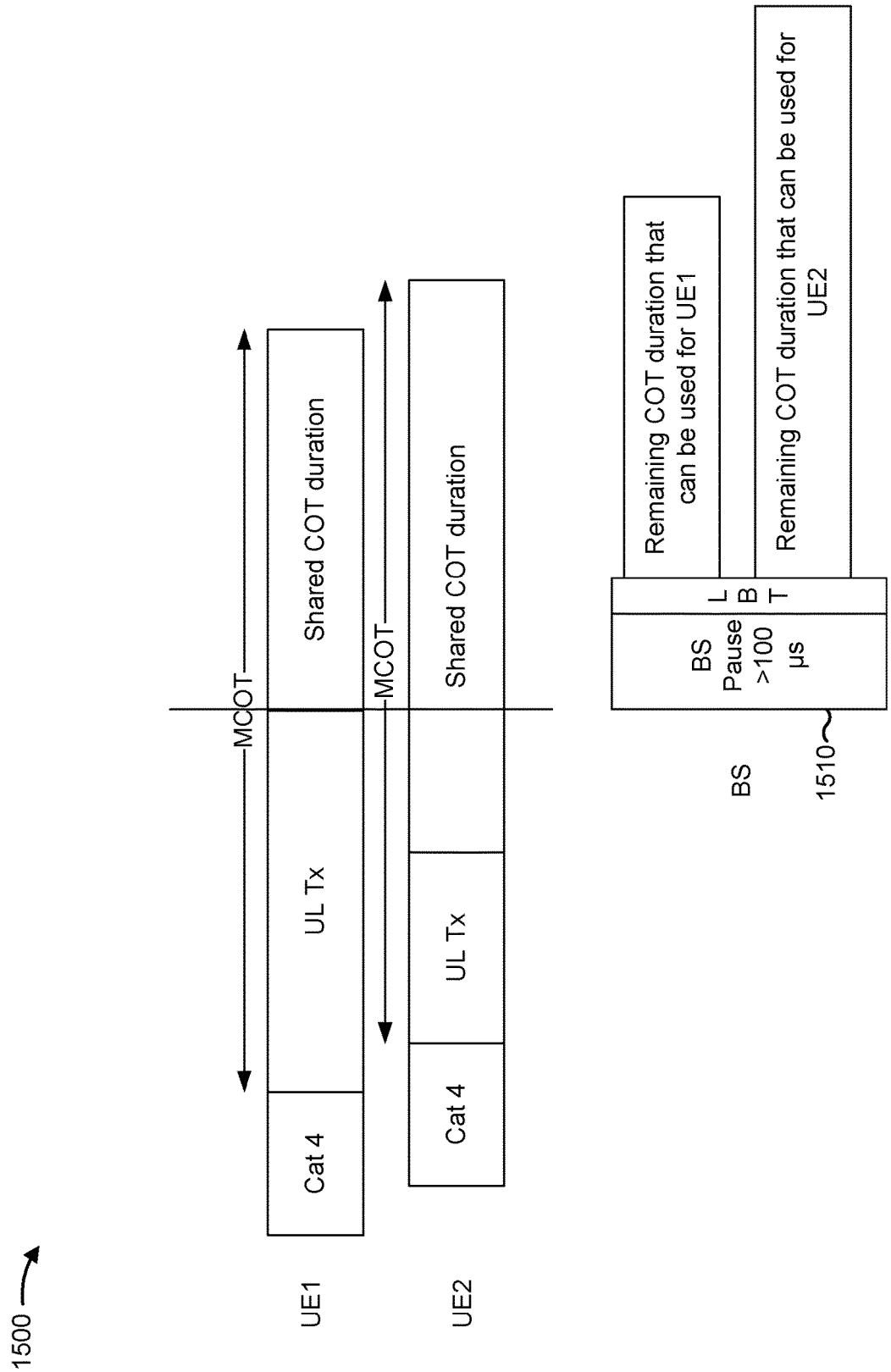

FIG. 15 illustrates an example 1500 of a scheduling approach for partially overlapped shared COTs with different transmission endpoints. As shown in FIG. 15, and by reference number 1510, the BS may perform a pause after the end of a last transmission endpoint of the UE1 and the UE2. Furthermore, the BS may perform an LBT operation after the pause, and may use the UE1's COT and the UE2's COT after the pause. In some aspects, the pause may be of a length sufficient that at least a threshold duration (such as approximately 100 microseconds or the like) have elapsed after the end of the last transmission endpoint before beginning the transmission. In this way, the BS may ensure that LBT requirements for both UEs are satisfied.

Figure 16:
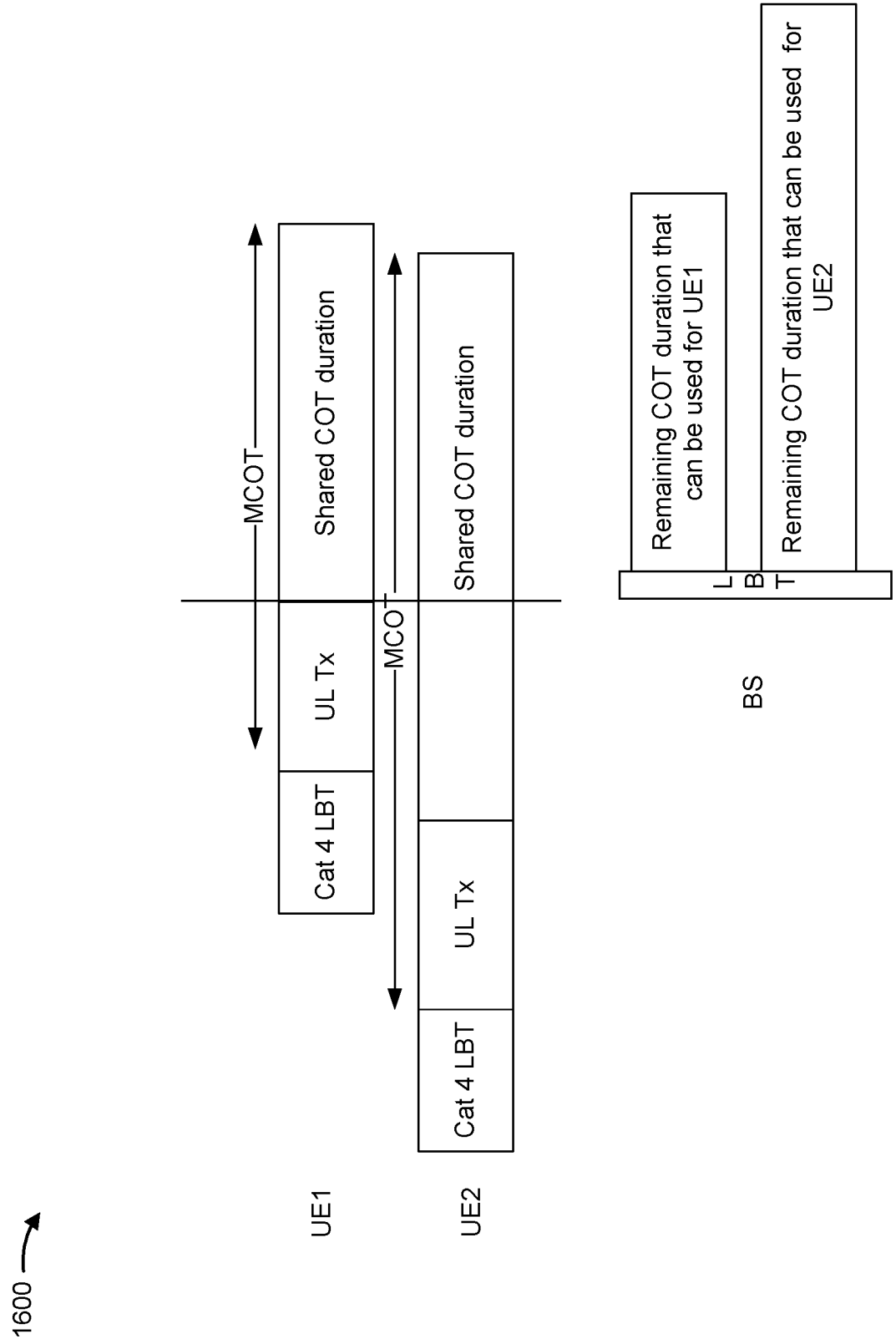

FIG. 16 illustrates an example 1600 of a scheduling approach for partially overlapped shared COTs with different transmission endpoints. In example 1600, the uplink transmissions of the UE1 and the UE2 do not overlap with each other. In this case, the BS may determine which UE is to be used for COT sharing and transmission. In a first example, the BS may select a UE associated with the later transmission (the UE1) to configure a DL transmission, and may determine a length of the BS's COT duration based on the UE1's COT duration. In this case, the BS may use only the COT duration of the UE1. In a second example, the BS may select a UE associated with the earlier transmission (the UE2) to configure a DL transmission, and may determine a length of the BS's COT duration based on the UE2's COT duration. In this case, the BS may use only the COT duration of the UE2. In a third example, the BS may determine to transmit to both UEs, and may accordingly determine the BS's COT duration in accordance with the COT durations of each UE, as shown in FIG. 16. In this case, the BS may use the COT durations of the UE1 and the UE2.

Figure 17:
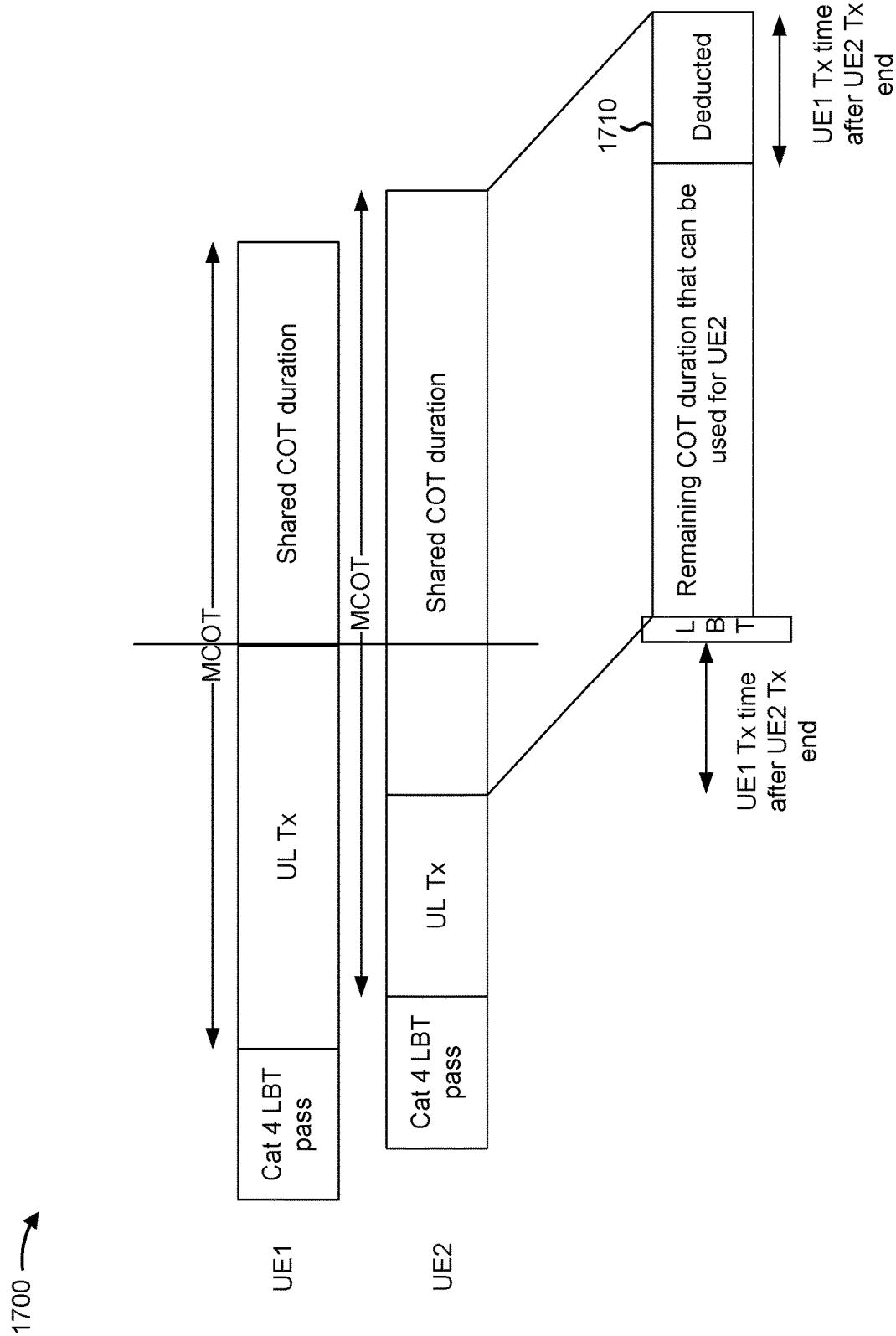

FIG. 17 illustrates an example 1700 of a scheduling approach for partially overlapped shared COTs with different transmission endpoints. In example 1700, the COT duration of the BS is adjusted based on the uplink transmission of the UE1 after the transmission endpoint of the UE2, or based on the transmission of the BS to the UE1 after the transmission endpoint of the UE2. In other words, FIG. 17 illustrates how the BS may determine the length of the COT to be used for the UE2 in the various scenarios described herein.

In some aspects, the uplink transmission of the UE1 after the transmission endpoint of the UE2 may not affect the COT duration of the BS with regard to the UE2. In other words, the BS may use the remaining duration of the UE2's shared COT duration as the BS's transmission duration for the UE2. In some aspects, this approach may be used for the examples 1300 and 1400 of FIGS. 13 and 14.

In some aspects, as shown by reference number 1710, a transmission time of the UE1 after the UE2's transmission endpoint may be deducted from the COT duration of the BS with regard to the UE2. It should be noted that the transmission time of the UE1 may not necessarily be deducted from an end of the COT duration of the BS with regard to the UE2, and that the COT duration of the BS with regard to the UE2 may not necessarily occur immediate after the transmission endpoint of the UE1. Thus, the BS may ensure that sufficient resources are allocated for the UE1's uplink transmission as well as the UE2's downlink transmission. In some aspects, a transmission time of the UE1 and a transmission time of the BS to the UE1 after the UE2's transmission endpoint may be deducted from the COT duration of the BS with regard to the UE2. In some aspects, a transmission time of the BS to the UE1 after the UE2's transmission endpoint may be deducted from the COT duration of the BS with regard to the UE2. In some aspects, one or more of the approaches described above may be used for the examples 1100 and 1200 of FIGS. 11 and 12. Thus, the BS may ensure that sufficient resources are allocated for the UE1's uplink transmission as well as the UE2's downlink transmission.

The example Figures are described in the context of two UEs. However, it should be understood that the techniques and apparatuses described herein can be implemented for any number of UEs that have at least partially overlapping COT durations. For the case when there are N UL transmissions from N different UEs (with no constraint on overlapping UL portions), the BS may select one or more of the N UEs for COT sharing to apply the example configurations described elsewhere herein. Example approaches for selecting the one or more UEs are described below.

In a first example, the BS may select the last K UEs, where a value of K can be fixed or determinable by the BS. In a second example, the BS may select the first L UEs, where a value of L can be fixed or determinable by the BS. In a third example, the BS may select all UEs for which a gap between an UL transmission endpoint and a BS transmission start is less than a threshold. In a fourth example, the BS may select a set of UEs such that, including a last UE of the set, each 2 consecutive UL transmissions are partially or fully overlapping. In a fifth example, the BS may select all UEs.

In some aspects, the BS may adjust the COT duration of a UE, as described in connection with FIG. 17, above. For example, the COT duration of a particular UE may be adjusted by taking into account the UEs that performed transmission after the particular UE's transmission endpoint. Furthermore, a COT duration for the particular UE may be adjusted based on an amount of time used by the BS to perform transmissions to any other UE that shared a COT with the BS.

Figure 18:
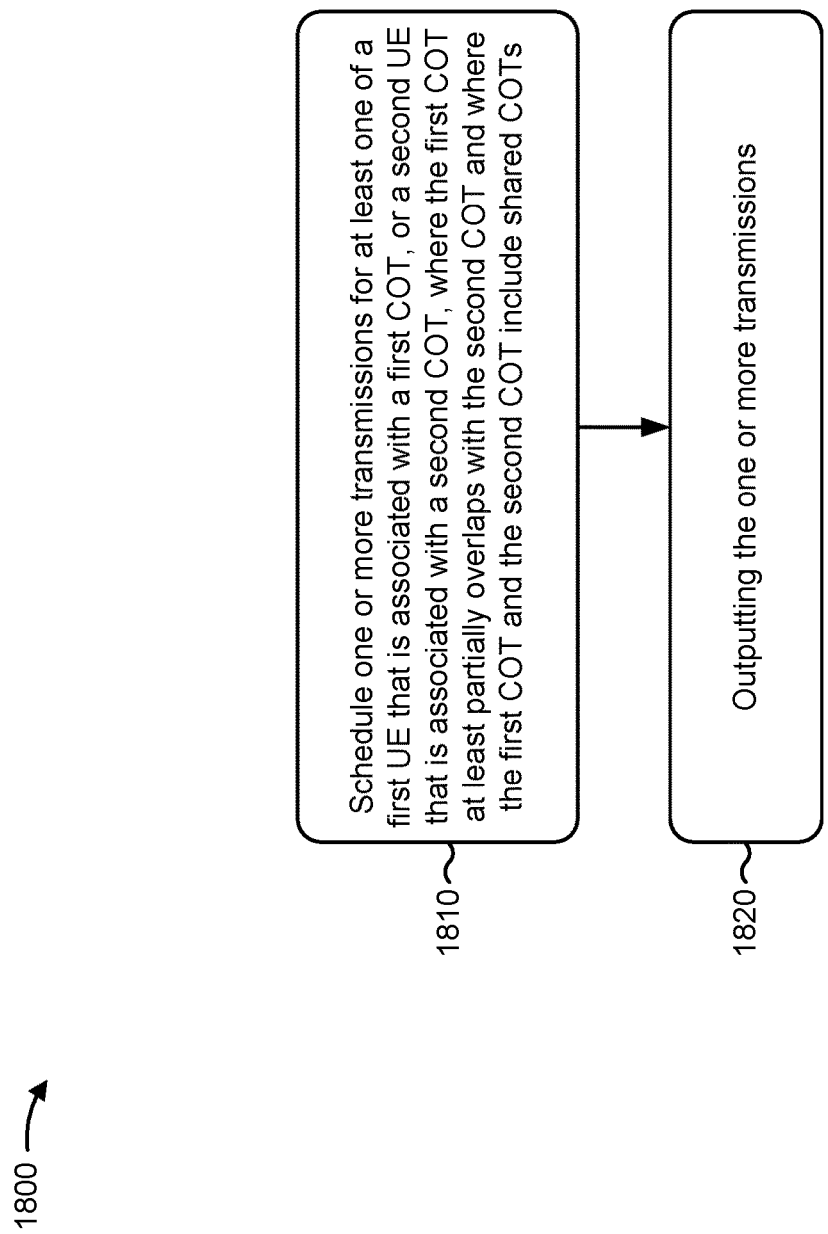
FIG. 18 is a diagram illustrating an example process performed, for example, by a BS.

FIG. 18 is a diagram illustrating an example process 1800 performed, for example, by a base station, in accordance with various aspects of the present disclosure. Example process 1800 shows where an apparatus of a base station (for example, base station 110 or the like) performs operations associated with channel occupancy time sharing.

As shown in FIG. 18, in some aspects, process 1800 may include scheduling one or more transmissions for at least one of a first UE that is associated with a first COT, or a second UE that is associated with a second COT, where the first COT at least partially overlaps with the second COT and where the first COT and the second COT include shared COTs (block 1810). For example, the base station (for example, using controller/processor 240, transmit processor 220, TX MIMO processor 230, MOD 232, antenna 234, or the like) may schedule one or more transmissions for at least one of a first UE that is associated with a first COT or a second UE that is associated with a second COT, as described above. In some aspects, the first COT at least partially overlaps with the second COT. In some aspects, the scheduling of the one or more transmissions is based on the first COT at least partially overlapping with the second COT. In some aspects, the first COT and the second COT include shared COTs.

As further shown in FIG. 18, in some aspects, process 1800 may include outputting the one or more transmissions (block 1820). For example, the base station (for example, using transmit processor 220, receive processor 238, controller/processor 240, memory 242, or the like) may output the one or more transmissions, as described above.

The process 1800 may include additional aspects, such as any single implementation or any combination of aspects described below or in connection with one or more other processes described elsewhere herein.

In a first aspect, the first COT and the second COT include shared COTs.

In a second aspect, alone or in combination with the first aspect, a portion of the one or more transmissions is scheduled in a time interval of the second COT that does not overlap the first COT.

In a third aspect, alone or in combination with any one or more of the first and second aspects, a portion of the one or more transmissions is scheduled in a subband of the second COT that does not overlap a subband of the first COT.

In a fourth aspect, alone or in combination with any one or more of the first through third aspects, scheduling the one or more transmissions is based on respective channel access priority levels associated with the first UE and the second UE.

In a fifth aspect, alone or in combination with any one or more of the first through fourth aspects, outputting the one or more transmissions further includes outputting a particular transmission, of the one or more transmissions, for the first UE after performing a listen-before-talk operation, where a pause is configured between an end of a transmission by the first UE and a beginning of the particular transmission using the first COT, and where the particular transmission overlaps at least in part with the second COT.

In a sixth aspect, alone or in combination with any one or more of the first through fifth aspects, the particular transmission is scheduled in the second COT.

In a seventh aspect, alone or in combination with any one or more of the first through sixth aspects, the one or more transmissions are scheduled in one or more of the first COT or the second COT, where the one or more transmissions include respective transmissions to the first UE and the second UE.

In an eighth aspect, alone or in combination with any one or more of the first through seventh aspects, the respective transmissions are scheduled after a pause that follows an end of a last transmission by the first UE or the second UE.

In a ninth aspect, alone or in combination with any one or more of the first through eighth aspects, scheduling the one or more transmissions further includes scheduling the one or more transmissions based on a shortened first COT, where the shortened first COT is shortened based on an uplink or downlink transmission associated with the second UE.

In a tenth aspect, alone or in combination with any one or more of the first through ninth aspects, the uplink or downlink transmission is performed in a pause of the base station, wherein the pause is associated with the first UE, and wherein the pause is initiated after a transmission endpoint of the first UE.

In an eleventh aspect, alone or in combination with any one or more of the first through tenth aspects, the first COT and the second COT have a same start time.

In a twelfth aspect, alone or in combination with any one or more of the first through eleventh aspects, the one or more transmissions include a first transmission for the first UE and a second transmission for the second UE, where the first transmission is schedulable in the first COT and the second transmission is schedulable in the second COT, and where the first transmission and the second transmission are schedulable in an overlapped portion of the first COT and the second COT.

In a thirteenth aspect, alone or in combination with any one or more of the first through twelfth aspects, the one or more transmissions include a first transmission for the first UE and a second transmission for the second UE, where the first transmission and the second transmission are schedulable in an overlapped portion of the first COT and the second COT, and where the first transmission and the second transmission are not schedulable in a non-overlapped portion of the first COT or the second COT.

In a fourteenth aspect, alone or in combination with any one or more of the first through thirteenth aspects, the one or more transmissions include a first transmission for the first UE and a second transmission for the second UE, where the first transmission and the second transmission are schedulable in an overlapped portion of the first COT and the second COT and in a non-overlapped portion of the first COT or the second COT.

In a fifteenth aspect, alone or in combination with any one or more of the first through fourteenth aspects, one or more control transmissions and one or more data transmissions are schedulable in the non-overlapped portion.

In a sixteenth aspect, alone or in combination with any one or more of the first through fifteenth aspects, first transmissions including control transmissions are schedulable in a time interval of the second COT that does not overlap the first COT.

In a seventeenth aspect, alone or in combination with any one or more of the first through sixteenth aspects, one of the first UE or the second UE is selected, and the the one or more transmissions are schedulable for the selected UE in a corresponding COT of the first COT or the second COT.

In an eighteenth aspect, alone or in combination with any one or more of the first through seventeenth aspects, only transmissions associated with the first UE or the second UE are schedulable in the first COT or the second COT.

In a nineteenth aspect, alone or in combination with any one or more of the first through eighteenth aspects, the base station may perform a transmission for a third UE in the first COT or the second COT.

In a twentieth aspect, alone or in combination with any one or more of the first through nineteenth aspects, the base station may perform a broadcast transmission in the first COT or the second COT.

In a twenty-first aspect, alone or in combination with any one or more of the first through twentieth aspects, the first UE is associated with a first subband and the second UE is associated with a second subband, where respective transmissions of the first UE and the second UE are schedulable on the first subband or on the second subband.

In a twenty-second aspect, alone or in combination with any one or more of the first through twenty-first aspects, an uplink transmission of the first UE ends after an uplink transmission of the second UE.

In a twenty-third aspect, alone or in combination with any one or more of the first through twenty-second aspects, the base station is associated with a maximum allowable pause length, and, based on a pause after an endpoint of the uplink transmission of the first UE being less than or equal to the maximum allowable pause length or based on no pause occurring after the endpoint of the uplink transmission, the one or more transmissions are schedulable using the first COT after the endpoint of the uplink transmission of the first UE.

In a twenty-fourth aspect, alone or in combination with any one or more of the first through twenty-third aspects, the base station is associated with a maximum allowable pause length, and, based on a pause after an endpoint of the uplink transmission of the first UE being less than or equal to the maximum allowable pause length or based on no pause occurring after the endpoint of the uplink transmission, a transmission is schedulable for the second UE in the first COT after the endpoint of the uplink transmission of the first UE.

In a twenty-fifth aspect, alone or in combination with any one or more of the first through twenty-fourth aspects, based on a pause of a threshold length being configured after an endpoint of the uplink transmission of the second UE, respective transmissions of the first UE and the second UE are schedulable in the first COT or the second COT.

In a twenty-sixth aspect, alone or in combination with any one or more of the first through twenty-fifth aspects, when a pause of a threshold length is not performed after an endpoint of the uplink transmission, a transmission of only the first UE is schedulable in the first COT.

In a twenty-seventh aspect, alone or in combination with any one or more of the first through twenty-sixth aspects, the base station is associated with a maximum allowable pause length, and, based on a pause after an endpoint of the uplink transmission of the second UE being less than or equal to the maximum allowable pause length or based on no pause occurring after the endpoint of the uplink transmission of the second UE, a data transmission or a control transmission of the second UE is schedulable in the first COT.

In a twenty-eighth aspect, alone or in combination with any one or more of the first through twenty-seventh aspects, the first UE is associated with a first transmission of the one or more transmissions, and the second UE is associated with a second transmission of the one or more transmissions, where the first transmission and the second transmission are schedulable using the first COT after an endpoint of the uplink transmission of the first UE, and where the first transmission and the second transmission are schedulable in the first COT or second COT after a pause of a threshold length has elapsed, and where the pause is after an endpoint of the uplink transmission of the second UE.

In a twenty-ninth aspect, alone or in combination with any one or more of the first through twenty-eighth aspects, respective transmissions for the first UE and the second UE are schedulable after an endpoint of the uplink transmission of the first UE in the first COT or second COT based on a listen-before-talk (LBT) operation being performed after the endpoint of the uplink transmission of the first UE.

In a thirtieth aspect, alone or in combination with any one or more of the first through twenty-ninth aspects, the base station may determine whether the listen-before-talk operation is to be performed or determining a configuration for the listen-before-talk operation, where scheduling the one or more transmissions is based on whether the listen-before-talk operation is performed or based on the configuration for the listen-before-talk operation.

In a thirty-first aspect, alone or in combination with any one or more of the first through thirtieth aspects, the uplink transmission of the first UE and the uplink transmission of the second UE are non-overlapped with each other.

In a thirty-second aspect, alone or in combination with any one or more of the first through thirty-first aspects, the base station may determine whether to schedule the one or more transmissions based on the first COT, the second COT, or a combination thereof.

In a thirty-third aspect, alone or in combination with any one or more of the first through thirty-second aspects, the first UE and the second UE are included in a plurality of UEs associated with respective COTs that at least partially overlap with each other.

In a thirty-fourth aspect, alone or in combination with any one or more of the first through thirty-third aspects, a portion of the one or more transmissions is scheduled in an overlapped portion of the first COT and the second COT.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

FIG. 19 is a diagram illustrating an example process 1900 performed, for example, by a first user equipment, in accordance with various aspects of the present disclosure. Example process 1900 shows where a first user equipment (for example, user equipment 120 or the like) performs operations associated with channel occupancy time sharing.

As shown in FIG. 19, in some aspects, process 1900 may include receiving scheduling information for one or more transmissions, where the one or more transmissions are for at least one of the first UE or a second UE, where the first UE is associated with a first COT and the second UE is associated with a second COT that at least partially overlaps with the first COT, and where the first COT and the second COT include shared COTs (block 1910). For example, the first UE (for example, using antenna 252, DEMOD 254, MIMO detector 256, receive processor 258, controller/processor 280, or the like) may receive scheduling information for one or more transmissions, as described above. In some aspects, the one or more transmissions are for at least one of the first UE or a second UE. In some aspects, the first UE is associated with a first COT and the second UE is associated with a second COT that at least partially overlaps with the first COT. In some aspects, the scheduling information is based on the first COT at least partially overlapping with the second COT.

As further shown in FIG. 19, in some aspects, process 1900 may include communicating in accordance with the scheduling information (block 1920). For example, the first UE (for example, using antenna 252, DEMOD 254, MIMO detector 256, receive processor 258, controller/processor 280, or the like) may communicate in accordance with the scheduling information, as described above.

The process 1900 may include additional aspects, such as any single implementation or any combination of aspects described below or in connection with one or more other processes described elsewhere herein.

In a first aspect, the first COT and the second COT include shared COTs.

In a second aspect, alone or in combination with the first aspect, the portion of the one or more transmissions is a first part, where a second portion of the one or more transmissions is scheduled in a time interval of the second COT that does not overlap the first COT.

In a third aspect, alone or in combination with any one or more of the first and second aspects, the portion of the one or more transmissions is a first part, where a second portion of the one or more transmissions is scheduled in a sub-band of the second COT that does not overlap the first COT.

In a fourth aspect, alone or in combination with any one or more of the first through third aspects, the scheduling information is based on respective channel access priority levels associated with the first UE and the second UE.

In a fifth aspect, alone or in combination with any one or more of the first through fourth aspects, transmitting the one or more transmissions further includes receiving a particular transmission of the one or more transmissions, where a particular time gap is to elapse between an end of a transmission by the first UE and a beginning of the particular transmission.

In a sixth aspect, alone or in combination with any one or more of the first through fifth aspects, the particular transmission is scheduled in the second COT.

In a seventh aspect, alone or in combination with any one or more of the first through sixth aspects, the one or more transmissions are scheduled in a particular COT, of the first COT or the second COT, where the one or more transmissions include respective transmissions to the first UE and the second UE.

In an eighth aspect, alone or in combination with any one or more of the first through seventh aspects, the respective transmissions are scheduled after a pause that follows an end of a last transmission by the first UE or the second UE.

In a ninth aspect, alone or in combination with any one or more of the first through eighth aspects, the scheduling information is based on a shortened first COT, where the shortened first COT is shortened based on an uplink or downlink transmission associated with the second UE that is performed after a transmission endpoint of the first UE.

In a tenth aspect, alone or in combination with any one or more of the first through ninth aspects, the uplink or downlink transmission is performed in a pause of a base station that is associated with the first UE after the transmission endpoint of the first UE.

In an eleventh aspect, alone or in combination with any one or more of the first through tenth aspects, the first COT and the second COT have a same start time.

In a twelfth aspect, alone or in combination with any one or more of the first through eleventh aspects, the one or more transmissions include a first transmission for the first UE and a second transmission for the second UE, where the first transmission is schedulable in the first COT and the second transmission is schedulable in the second COT, and where the first transmission and the second transmission are schedulable in an overlapped portion of the first COT and the second COT.

In a thirteenth aspect, alone or in combination with any one or more of the first through twelfth aspects, the one or more transmissions include a first transmission for the first UE and a second transmission for the second UE, where the first transmission and the second transmission are schedulable in an overlapped portion of the first COT and the second COT, and where the first transmission and the second transmission are not schedulable in a non-overlapped portion of the first COT or the second COT.

In a fourteenth aspect, alone or in combination with any one or more of the first through thirteenth aspects, the one or more transmissions include a first transmission for the first UE and a second transmission for the second UE, where the first transmission and the second transmission are schedulable in an overlapped portion of the first COT and the second COT, and in a non-overlapped portion of the first COT or the second COT.

In a fifteenth aspect, alone or in combination with any one or more of the first through fourteenth aspects, control transmissions and data transmissions are schedulable in the non-overlapped portion.

In a sixteenth aspect, alone or in combination with any one or more of the first through fifteenth aspects, first transmissions including control transmissions are schedulable in a time interval of the second COT that does not overlap the first COT.

In a seventeenth aspect, alone or in combination with any one or more of the first through sixteenth aspects, the first UE is a selected UE, of the first UE or the second UE, for which the one or more transmissions are to be scheduled, where the one or more transmissions are schedulable for the selected UE in a corresponding COT of the first COT or the second COT.

In an eighteenth aspect, alone or in combination with any one or more of the first through seventeenth aspects, only transmissions associated with the first UE or the second UE are schedulable in the first COT or the second COT.

In a nineteenth aspect, alone or in combination with any one or more of the first through eighteenth aspects, the first UE may receive a broadcast transmission in the first COT or the second COT.

In a twentieth aspect, alone or in combination with any one or more of the first through nineteenth aspects, the first UE is associated with a first subband and the second UE is associated with a second subband, where respective transmissions of the first UE and the second UE are schedulable on the first subband or on the second subband.

In a twenty-first aspect, alone or in combination with any one or more of the first through twentieth aspects, an uplink transmission of the first UE ends after an uplink transmission of the second UE.

In a twenty-second aspect, alone or in combination with any one or more of the first through twenty-first aspects, the one or more transmissions are schedulable only for the first UE in the first COT after an endpoint of the uplink transmission and when no pause, of a threshold length, is to be performed after the endpoint of the uplink transmission.

In a twenty-third aspect, alone or in combination with any one or more of the first through twenty-second aspects, when a pause of a threshold length is performed after an endpoint of the uplink transmission, respective transmissions of the first UE and the second UE are schedulable in the first COT or the second COT.

In a twenty-fourth aspect, alone or in combination with any one or more of the first through twenty-third aspects, when a pause of a threshold length is not performed after an endpoint of the uplink transmission, a transmission of only the first UE is schedulable in the first COT.

In a twenty-fifth aspect, alone or in combination with any one or more of the first through twenty-fourth aspects, when a pause of a threshold length is not performed after an endpoint of the uplink transmission, a data transmission or a control transmission of the first UE, or a control transmission of the second UE, is schedulable in the first COT.

In a twenty-sixth aspect, alone or in combination with any one or more of the first through twenty-fifth aspects, the first UE is associated with a first transmission of the one or more transmissions, and the second UE is associated with a second transmission of the one or more transmissions, where the first transmission is schedulable using the first COT after an endpoint of the uplink transmission of the first UE, and where the first transmission and the second transmission are schedulable in the first COT or second COT after a pause of a threshold length has elapsed after an endpoint of the uplink transmission of the second UE.

In a twenty-seventh aspect, alone or in combination with any one or more of the first through twenty-sixth aspects, respective transmissions for the first UE and the second UE are schedulable after an endpoint of the uplink transmission of the first UE in the first COT or second COT when a listen-before-talk operation is performed after the endpoint of the uplink transmission of the first UE.

In a twenty-eighth aspect, alone or in combination with any one or more of the first through twenty-seventh aspects, the uplink transmission of the first UE and the uplink transmission of the second UE are non-overlapped with each other.

In a twenty-ninth aspect, alone or in combination with any one or more of the first through twenty-eighth aspects, the first UE and the second UE are included in a plurality of UEs associated with respective COTs that at least partially overlap with each other.

In a thirtieth aspect, alone or in combination with any one or more of the first through twenty-ninth aspects, a portion of the one or more transmissions is scheduled in an overlapped portion of the first COT and the second COT.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by an apparatus of a network entity, comprising:
    scheduling first transmissions for a first user equipment (UE) that is associated with a first channel occupancy time (COT) and a second UE that is associated with a second COT,
        wherein the first COT at least partially overlaps with the second COT,
        wherein the first COT and the second COT include shared COTs,
        wherein one or more first downlink transmissions, of the first transmissions, for the first UE and the second UE are scheduled, by the apparatus of the network entity, in a first time interval when the first COT overlaps with the second COT, and
        wherein one or more second downlink transmissions, of the first transmissions, for the first UE are scheduled, by the apparatus of the network entity, after the first time interval, in a second time interval when the second COT has elapsed and the first COT continues;
    scheduling second transmissions based on the second COT being shorter than the first COT,
        wherein the second COT is shorter than the first COT based on an uplink transmission of the second UE, and
        wherein the uplink transmission of the second UE continues during a pause after an endpoint of an uplink transmission of the first UE; and
    outputting the first transmissions and the second transmissions.

2. The method of claim 1, wherein a portion of the first transmissions is scheduled in a subband of the first COT that does not overlap a subband of the second COT.

3. The method of claim 1, wherein scheduling the first transmissions is based on respective channel access priority levels associated with the first UE and the second UE.

4. The method of claim 1, wherein outputting the first transmissions and the second transmissions further comprises:
outputting a particular transmission using the second COT after performing a listen-before-talk (LBT) operation,
wherein the pause is configured between the endpoint of the uplink transmission of the first UE and a beginning of the particular transmission using the first COT, and
wherein the particular transmission overlaps at least in part with the second COT.

5. The method of claim 1, wherein the first transmissions include a first transmission for the first UE and a second transmission for the second UE, wherein the first transmission is schedulable in the first COT and the second transmission is schedulable in the second COT, and wherein the first transmission and the second transmission are schedulable in an overlapped portion of the first COT and the second COT.

6. The method of claim 1, wherein the first transmissions include a first transmission for the first UE and a second transmission for the second UE, wherein the first transmission and the second transmission are schedulable in an overlapped portion of the first COT and the second COT and in a non-overlapped portion of the first COT or the second COT.

7. The method of claim 6, wherein one or more control transmissions and one or more data transmissions are schedulable in the non-overlapped portion.

8. The method of claim 1, wherein one of the first UE or the second UE is selected, and one or more transmissions, of the first transmissions, are schedulable for the selected UE in a corresponding COT of the first COT or the second COT.

9. The method of claim 1, wherein the uplink transmission of the second UE ends after the uplink transmission of the first UE.

10. The method of claim 9, wherein the network entity is associated with a maximum allowable pause length, and wherein, based on the pause being less than or equal to the maximum allowable pause length or based on no pause occurring after the endpoint of the uplink transmission of the second UE, one or more transmissions, of the second transmissions, are schedulable using the second COT after the endpoint of the uplink transmission of the second UE.

11. The method of claim 9, wherein the network entity is associated with a maximum allowable pause length, and wherein, based on the pause being less than or equal to the maximum allowable pause length or based on no pause occurring after the endpoint of the uplink transmission of the second UE, a transmission is schedulable for the first UE in the second COT after the endpoint of the uplink transmission of the second UE.

12. The method of claim 9, wherein, based on the pause satisfying a threshold length, respective transmissions of the first UE and the second UE are schedulable in the first COT or the second COT after the pause.

13. The method of claim 9, wherein the network entity is associated with a maximum allowable pause length, and wherein, based on the pause being less than or equal to the maximum allowable pause length or based on no pause occurring after the endpoint of the uplink transmission of the second UE, a data transmission or a control transmission of the first UE is schedulable in the second COT.

14. The method of claim 9, wherein the first UE is associated with a first transmission of the second transmissions, and the second UE is associated with a second transmission of the second transmissions,
wherein the first transmission and the second transmission are schedulable using the second COT after an endpoint of the uplink transmission of the second UE, and
wherein the first transmission and the second transmission are schedulable in the first COT or the second COT after the pause has elapsed,
wherein the pause satisfies a threshold length.

15. The method of claim 9, wherein respective transmissions for the first UE and the second UE are schedulable after the endpoint of the uplink transmission of the second UE in the first COT or the second COT based on a listen-before-talk (LBT) operation being performed after the endpoint of the uplink transmission of the second UE.

16. A method of wireless communication performed by an apparatus of a first user equipment (UE), comprising:
obtaining scheduling information for first transmissions and second transmissions,
wherein the first transmissions are for the first UE and a second UE,
wherein the first UE is associated with a first channel occupancy time (COT) and the second UE is associated with a second COT that at least partially overlaps with the first COT,
wherein the first COT and the second COT include shared COTs,
wherein one or more first downlink transmissions, of the first transmissions, for the first UE and the second UE are scheduled in a first time interval when the first COT overlaps with the second COT, and
wherein one or more second downlink transmissions, of the first transmissions, for the first UE are scheduled in a second time interval, after the first time interval, when the second COT has elapsed and the first COT continues, and
wherein the second transmissions are based on the second COT being shorter than the first COT,
wherein the second COT is shorter than the first COT based on an uplink transmission of the second UE, and
wherein the uplink transmission of the second UE continues during a pause after an endpoint of an uplink transmission of the first UE; and
communicating in accordance with the scheduling information.

17. The method of claim 16, wherein the scheduling information is based on respective channel access priority levels associated with the first UE and the second UE.

18. The method of claim 16, further comprising:
obtaining a broadcast transmission in the first COT or the second COT.

19. The method of claim 16, wherein the first UE is associated with a first subband and the second UE is associated with a second subband, and
wherein respective transmissions of the first UE and the second UE are schedulable on the first subband or on the second subband.

20. An apparatus of a network entity for wireless communication, comprising:
a processing system configured to:
schedule first transmissions for a first user equipment (UE) that is associated with a first channel occupancy time (COT) and a second UE that is associated with a second COT,
wherein the first COT at least partially overlaps with the second COT,
wherein the first COT and the second COT include shared COTs,
wherein one or more downlink transmissions, of the first transmissions, for the first UE and the second UE are scheduled, by the apparatus of the network entity, in a first time interval when the first COT overlaps with the second COT, and
wherein one or more second downlink transmissions, of the first transmissions, for the first UE are scheduled, by the apparatus of the network entity, in a second time interval, after the first time interval, when the second COT has elapsed and the first COT continues;
schedule second transmissions based on the second COT being shorter than the first COT,
wherein the second COT is shorter than the first COT based on an uplink transmission of the second UE, and
wherein the uplink transmission of the second UE continues during a pause after an endpoint of an uplink transmission of the first UE; and
an interface configured to output the first transmissions and the second transmissions.

21. The apparatus of claim 20, wherein the uplink transmission of the second UE ends after the uplink transmission of the first UE.

22. The apparatus of claim 21, wherein the network entity is associated with a maximum allowable pause length, and wherein, based on the pause being less than or equal to the maximum allowable pause length or based on no pause occurring after the endpoint of the uplink transmission of the second UE, the processing system is configured to schedule one or more transmissions, of the second transmissions, using the second COT after the endpoint of the uplink transmission of the second UE.

23. The apparatus of claim 21, wherein the network entity is associated with a maximum allowable pause length, and wherein, based on the pause being less than or equal to the maximum allowable pause length or based on no pause occurring after the endpoint of the uplink transmission of the second UE, the processing system is configured to schedule a transmission for the first UE in the second COT after the endpoint of the uplink transmission of the second UE.

24. The apparatus of claim 21, wherein, based on the pause satisfying a threshold length, the processing system is configured to schedule respective transmissions of the first UE and the second UE in the first COT or the second COT after the pause.

25. The apparatus of claim 21, wherein the network entity is associated with a maximum allowable pause length, and wherein, based on the pause being less than or equal to the maximum allowable pause length or based on no pause occurring after the endpoint of the uplink transmission of the second UE, the processing system is configured to schedule a data transmission or a control transmission of the first UE in the second COT.

26. An apparatus of a first user equipment (UE) for wireless communication, comprising:
a first interface configured to obtain scheduling information for first transmissions and second transmissions,
wherein the first transmissions are for the first UE and a second UE,
wherein the first UE is associated with a first channel occupancy time (COT) and the second UE is associated with a second COT that at least partially overlaps with the first COT,
wherein the first COT and the second COT include shared COTs,
wherein one or more first downlink transmissions, of the first transmissions, for the first UE and the second UE are scheduled in a first time interval when the first COT overlaps with the second COT, and
wherein one or more second downlink transmissions, of the first transmissions, for the first UE are scheduled in a second time interval, after the first time interval, when the second COT has elapsed and the first COT continues, and
wherein the second transmissions are based on the second COT being shorter than the first COT,
wherein the second COT is shorter than the first COT based on an uplink transmission of the second UE, and
wherein the uplink transmission of the second UE continues during a pause after an endpoint of an uplink transmission of the first UE; and
a second interface configured to communicate in accordance with the scheduling information.

27. The apparatus of the first UE of claim 26, wherein the scheduling information is based on respective channel access priority levels associated with the first UE and the second UE.

28. The apparatus of the first UE of claim 26, wherein the first interface is further configured to:
obtain a broadcast transmission in the first COT or the second COT.

29. The apparatus of the first UE of claim 26, wherein the first UE is associated with a first subband and the second UE is associated with a second subband, and
wherein respective transmissions of the first UE and the second UE are schedulable on the first subband or on the second subband.

30. The apparatus of the first UE of claim 26, wherein a portion of the first transmissions is scheduled in a subband of the first COT that does not overlap a subband of the second COT.

* * * * *